US008515883B2

(12) United States Patent
Junker

(10) Patent No.: US 8,515,883 B2
(45) Date of Patent: Aug. 20, 2013

(54) SYSTEMS AND METHODS FOR GENERATING MISSING RULES MATCHING A MINIMAL SET OF OBJECTS

(75) Inventor: Ulrich M. Junker, Biot (FR)

(73) Assignee: International Business Machines Corporation, Armonk, NY (US)

(*) Notice: Subject to any disclaimer, the term of this patent is extended or adjusted under 35 U.S.C. 154(b) by 290 days.

(21) Appl. No.: 13/020,203

(22) Filed: Feb. 3, 2011

(65) Prior Publication Data
US 2012/0203583 A1 Aug. 9, 2012

(51) Int. Cl.
*G06F 15/18* (2006.01)
*G06N 3/00* (2006.01)
*G06N 3/12* (2006.01)

(52) U.S. Cl.
USPC .......................................................... 706/13

(58) Field of Classification Search
USPC .......................................................... 706/13
See application file for complete search history.

(56) References Cited

U.S. PATENT DOCUMENTS

| | | | |
|---|---|---|---|
| 5,259,066 A | 11/1993 | Schmidt | |
| 5,317,677 A | 5/1994 | Dolan et al. | |
| 7,565,642 B2 * | 7/2009 | Moore et al. | 717/117 |
| 7,587,379 B2 | 9/2009 | Huelsman et al. | |
| 7,630,910 B2 | 12/2009 | Bonissone et al. | |
| 7,676,387 B2 | 3/2010 | Childress et al. | |
| 2007/0006190 A1 * | 1/2007 | Surasinghe | 717/143 |

OTHER PUBLICATIONS

A Hybrid Non-strict Implicit Constraints Solving Algorithm Yu Haiyan, He Yuanjun, and Geng Zhaofeng.*
Spreeuwenberg, S., et al., "Requirements for Successful Verification in Practice", Proceedings of the Fifteenth International Florida Artificual Intelligence Research Society Conference table of contents. Page: 221-225, Published 2002.
Hicks, R., "Knowledge Base Management Systems-Tools for Creating Verified Intelligent Systems", Knowledge-Based Systems 16 (2003), pp. 165-171.

* cited by examiner

*Primary Examiner* — Kakali Chaki
*Assistant Examiner* — Ababacar Seck
(74) *Attorney, Agent, or Firm* — Fox Rothschild, LLP; Robert J. Sacco

(57) ABSTRACT

A method (1500) for generating a Generalized Missing Rule (GMR). The method involves receiving descriptions of First Scopes (FSs) that are admissible for a First Rule Project (FRP). FRP comprises first rules. Each FS is defined by at least one object characterizing a case. An Expanded Set of Scope Descriptions (ESSD) is generated by adding descriptions of Second Scopes (SSs) covered by FRP to the descriptions of FSs. An Implicit Description (ID) of FSs and SSs is produced. An Incomplete Most-General Scope (IMGS) is identified from FSs and SSs using ID. IMGS is a scope which is defined by a minimal set of objects, is admissible for FRP and covers at least one case which is not treated by a Second Rule Project (SRP). A Missing Case (MC) of IMGS is identified. MC is not treated by FRP. GMR is generated using MC and IMGS.

14 Claims, 19 Drawing Sheets

SYSTEMS AND METHODS FOR GENERATING MISSING RULES MATCHING A MINIMAL SET OF OBJECTS

BACKGROUND OF THE INVENTION

1. Statement of the Technical Field

The inventive arrangements relate to computing systems, and more particularly to systems and methods for identifying missing rules within rule projects for complex cases and generating said missing rules which match a minimal set of objects.

2. Description of the Related Art

A rule is a statement that defines or constrains some aspect of an organization. In practice, the rule is implemented so as to control the behavior of the organization. Accordingly, the rule describes the operations, definitions and constraints that apply to the organization. The rules can apply to people, processes, corporate behavior and computing systems in the organization. The rules are typically put in place to help the organization achieve its goals. For example, a rule might state that "a loan is to be rejected if a prospective borrower has a credit score below a certain value".

Rules are often used to represent policies that occur in routine tasks (e.g., tasks relating to insurance-claim acceptances, loan approvals and pricing of items). Each task generally involves making a decision for a case (e.g., an insurance claim, a loan or an item's price) and applying an action to the case based on the results of said decision. Each case is characterized by numerous objects of given types (e.g., an insurance claim, an insured and a contract). The objects define the scope of the case. Each case is described in a multi-dimensional space (e.g., a Cartesian space). For example, if a case is described in a two dimensional space, then an attribute of a first object (e.g., a data format supported by a camcorder) is plotted along an X-axis of a coordinate plane and an attribute of a second object (e.g., a screen size of a television) is plotted along a Y-axis of the coordinate plane. The decision usually involves: determining if a case satisfies a condition (e.g., the amount of damage to the insured item exceeds the amount of a deductible); and selecting an option from a plurality of options (e.g., accept or reject). Thereafter, an action defined by the selected option is applied to the case (e.g., accept the insurance claim).

In many scenarios, a set of rules are needed during a single decision-making process. The set of rules are complete when the rules facilitate the decision-making process for each relevant case. If a set of rules are not complete, then new rules need to be added to the set of rules. The need for new rules may arise as a result of unforeseen interactions between tests of existing rules used to determine if cases satisfy certain conditions. The tests may complement each other in first dimensions of a multi-dimensional space in which a case is described if certain values in second dimensions of the multi-dimensional space are fixed, and leave gaps for other values. For example, an attribute (e.g., data formats) of a first item (e.g., a camcorder) is plotted along on X-axis of a coordinate system and an attribute (e.g., screen size) of a second item (e.g., a television) is plotted along a Y-axis of a coordinate system. A first test may be performed to determine if a first item satisfies a first condition (e.g., a camcorder is a High Definition (HD) camcorder). A second test may be performed to determine if a second item satisfies a second condition (e.g., a television has a screen larger than fifty inches). The first and second tests complement each other in the first dimension of the multi-dimensional space for televisions with screen sizes larger than fifty inches and complement each other in the second dimension for HD camcorders, because they collectively define a third test for determining if the first and second items satisfy the first or second conditions (e.g., a camcorder is an HD camcorder OR a television has a screen larger than fifty inches). However, the first and second tests do not complement each other in the first dimension of the multi-dimensional space for televisions with other screen sizes and in the second dimensions for non-HD camcorders. In this regard, it should be understood that the first and second rules do not define a fourth test for determining if the first item satisfies a third condition (e.g., the camcorder is a non-HD camcorder) and the second item satisfies a fourth condition (e.g., the television has a screen less than fifty inches). Consequently, a set of rules including the first and second rules is incomplete since the fourth rule needs to be added thereto.

The task of detecting whether or not rules are missing from a set of rules is an inherently combinatorial problem which is difficult to solve. The difficulty in solving the combinatorial problem is at least partially due to the fact that cases may consist of an unbounded number of objects. For example, a discount determination requires the inspection of an unbounded number of bought items in the shopping cart of a customer. Although each instance of an object type has a finite number of attributes (i.e., dimensions), each additional instance of the object type adds copies of these dimensions to the space which characterizes the cases. Although each case consists of a finite number of objects (and can thus be characterized by a finite number of dimensions), there will always be a larger case having more objects if the number of objects is not bounded. A multi-dimensional space that characterizes all these possible cases will thus consist of an infinite number of dimensions, although only a finite subset of these dimensions is relevant for characterizing a particular case.

A single Cartesian space provides an inadequate characterization of complex cases, which consists of different types and numbers of objects. This lack of a general definition of complex cases constitutes a severe obstacle for analytical tasks, such as rule learning, rule completeness analysis, rule testing and rule simulation. Currently, there are no known methods that provide a simple characterization of complex cases.

Despite of the above-identified difficulties, rules are able to handle complex cases. Each rule concerns only a portion of the objects that comprise a complex case. To be precise, each rule concerns a fixed list of object types. The rule matches a configuration of objects from a case description if the objects are of the type contained in the fixed list of object types. The rule together with the matched objects forms a rule instance. A rule may have multiple instances for a given case. For example, if a case consists of one hundred (100) bought items in a shopping cart, then a rule matching an item in the shopping cart has one hundred (100) instances, namely one (1) for each item. The scope of a rule thus defines a view of a complex case even if the number of objects in the complex case is unbounded. Although the complex case cannot be characterized by a finite number of dimensions, each view of the complex case has only a finite number of dimensions. The views of a complex case allow the rules to be able to handle cases consisting of an unbounded number of objects. Therefore, a view is an effective way to characterize relevant information of a complex case in a finite dimensional space. However, the number of views is infinite as there is an infinite number of combinations of object types which may constitute valid scopes of a case. For the generation of missing rules, this means that missing rules need to be determined in an unbounded number of scopes, thus undesirably leading to an unbounded explosion of the number of missing rules.

SUMMARY OF THE INVENTION

The present invention generally concerns implementing systems and methods for generating at least one generalized missing rule. The methods involve receiving descriptions of first scopes that are admissible for a first rule project. The first rule project comprises a plurality of first rules. Each of the first scopes is defined by at least one object characterizing a case. An expanded set of scope descriptions is then generated by adding descriptions of second scopes covered by the first rule project to the descriptions of the first scopes. Thereafter, an implicit description of the first and second scopes described by the expanded set of scope descriptions is produced. The implicit description is used to identify an incomplete most-general scope from the first and second scopes. The incomplete most-general scope is a scope which is defined by a minimal set of objects, is admissible for the first rule project and covers at least one case which is not treated by a second rule project. The second rule project may include at least one rule comprising the first rule project. After identifying the incomplete most-general scope, a missing case thereof is identified that is not treated by the first rule project. Subsequently, the generalized missing rule is generated using information describing the missing case and the incomplete most-general scope. The generalized missing rule may then be added to the second rule project and used to control operations of an organization.

According to aspects of the present invention, the implicit description is in the form of a constraint graph. In this scenario, the constraint graph is generated by: generating a first constraint graph using the information describing the first scopes; generating a second constraint graph using the information describing the first rule project; and generating a third constraint graph by building a disjunction of the first and second constraint graphs. The third constraint graph includes information representing all scopes that are admissible for the first rule project.

According to other aspects of the preset invention, the incomplete most-general scope is identified by: generating a rule-inhibition graph including information representing at least one case which is not covered by the first and second scopes described by the expanded set of scope descriptions; generating an incomplete scope graph by building a conjunction of the rule-inhibition graph and the implicit description which is in the form of a constraint graph; using the incomplete scope graph to identify an incomplete scope; generating an inadmissible scope graph by negating the constraint graph; and using the incomplete scope and the inadmissible scope graph to identify the incomplete most-general scope.

According to other aspects of the preset invention, the missing case is identified by: determining second rules using information describing the second rule project and the incomplete most-general scope; determining if a scope matched by a rule of the second rules is a sub-scope of the incomplete most-general scope; discarding the rule if it is determined that the scope matched by the rule is not a sub-scope of the incomplete most-general scope; and retaining the rule if it is determined that the scope matched by the rule is a sub-scope of the incomplete most-general scope. The second rule project comprises the first rules. The second rule project also comprises one or more previously generated missing rules. The previously generated missing rules may differ in scope. The second rules treat cases having the incomplete most-general scope.

According to other aspects of the preset invention, the generalized missing rule is generated by: determining second rules that treat cases having the incomplete most-general scope or sub-scopes of the incomplete most-general scope; analyzing the second rules to identify third rules that treat the missing case; and selecting a fourth rule from the third rules that has the most-general conditions thereof.

Notably, the above described methods can be used to generate all missing rules of the first rule project which have most-general scopes and most-general conditions. In this regard, it should be understood that the above described methods can further involve iteratively performing certain steps until the second rule project has no incomplete most-general scopes. The steps can include, but are not limited to, the following steps: identifying the incomplete most-general scope; identifying the missing case; generating the generalized missing rule; and adding the generalized missing rule to the second rule project.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
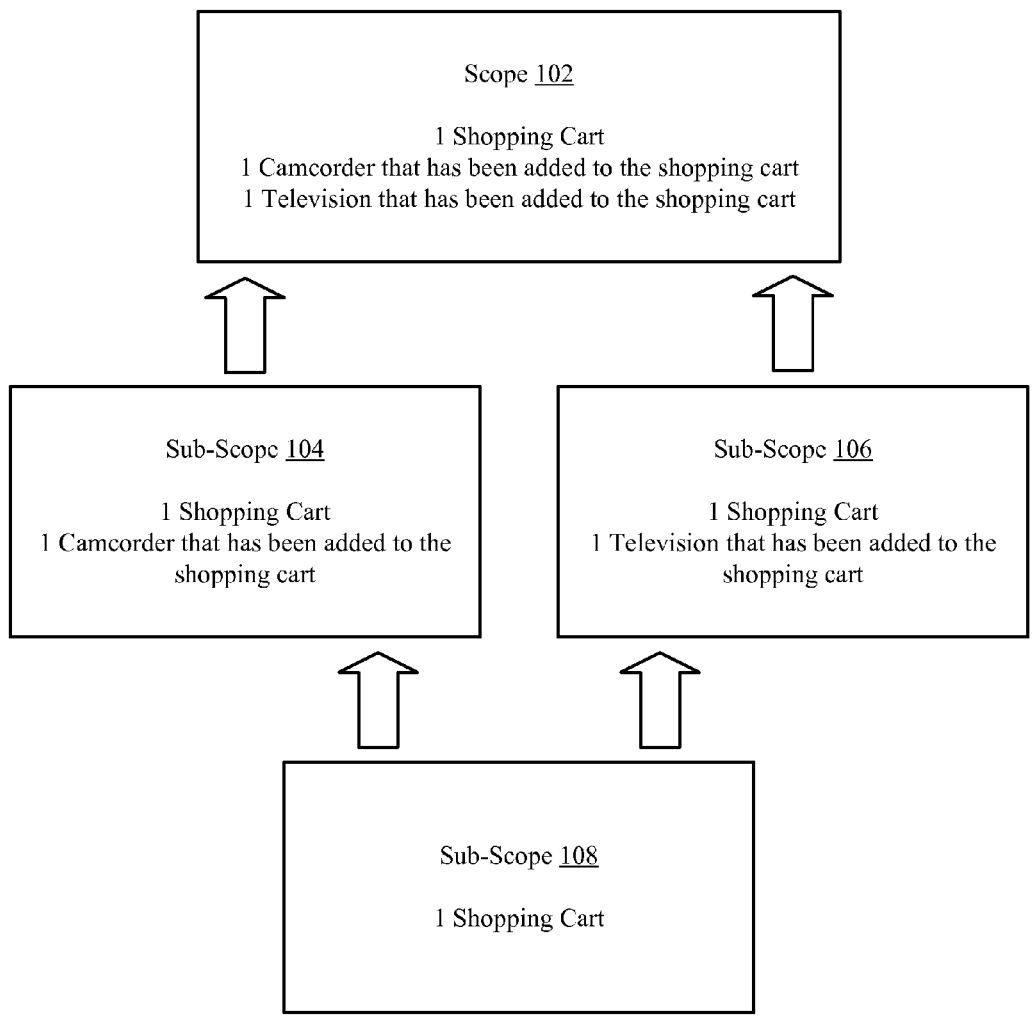
FIG. 1 is a schematic illustration of a scope and its sub-scopes that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present invention generally concerns implementing systems and methods for finding missing rules within a business rule project (i.e., a set of business rules defining aspects of a complex case). The phase "business rule", as used herein, refers to a statement that defines or constrains some aspect of a business organization. A complex case is heterogeneous (i.e., a complex case involves an unbounded number of objects). Accordingly, a complex case has a variable scope. Since the complex case has a variable scope, it can not be adequately characterized in a Cartesian space. The complex case can be described by a plurality of sub-cases having fixed scopes. The fixed scope of a sub-case describes the number and types of the objects thereof. The fixed scope has a corresponding structure. The structure defines how the objects of the fixed scope are connected. Notably, not all sub-cases have fixed scopes that are admissible for a business rule project (i.e., not all fixed scopes describe a sufficient number and types of objects for making a decision for the complex case). Also, sub-cases having fixed scopes can be adequately characterized in Cartesian spaces.

Method embodiments of the present invention generally involve: receiving information describing first scopes that are admissible for a business rule project; receiving information describing a business rule project; generating an expanded set of scope descriptions by adding descriptions of second scope covered by the business rule project to the descriptions of the first scopes; producing an implicit description (e.g., a constraint graph) of the scope described by expanded set of scope descriptions; use the implicit description to identify at least one most-general scope that is incomplete ("the incomplete most-general scope"); identify a case of the incomplete most-general scope that is not treated by the business rules of the business rule project and/or any missing business rules that have been previously generated; and generating a generalized missing business rule using a description of the missing case and a description of the incomplete most-general scope. The generalized business rule can then be added to a set of business rules. The set of business rules are then used to control operations of a business organization.

The present invention can be used in a variety of applications. Such applications include, but are not limited to, computing applications, decision making applications, operation control applications and any other application in which tasks can be automated. General concepts are described below in relation to FIGS. 1-4 that are useful for understanding the present invention. Exemplary implementing systems will be described in relation to FIGS. 5-16. Exemplary method embodiments of the present invention will be described below in relation to FIGS. 15-19.

Discussion of General Concepts that are Useful for Understanding the Present Invention Business rules may be used to make decisions for given cases. For example, a business rule can be used to accept an insurance claim, reject an insurance claim, determine the amount of a discount for articles in a shopping cart or determine whether to award bonus points to a customer based on the types of items added to a shopping cart. A case consists of objects of given types. For example, if the case relates to an insurance claim, then the objects of the case include, but are not limited to, the insurance claim, the insured and the contract. If the case relates to discount determinations, then the objects of the case include, but are not limited to, a shopping cart, items added to the shopping cart and a customer. Embodiments of the present invention are not limited in this regard.

The number and types of objects of a case constitute the scope of the case. The scope of a case can be a fixed scope or a variable scope. For example, in the insurance claim scenario, the cases have fixed scopes, i.e., the cases consist of the same number and types of objects (e.g., an insurance claim, an insured and a contract). In the discount scenario, cases have variable scopes, i.e., the cases consist of different numbers and types of objects.

Cases having fixed scopes may have different attribute values for the objects. Cases having fixed scopes can be adequately characterized by a finite number of dimensions of a single Cartesian space. In contrast, cases having variable scopes can not be adequately characterized by a finite number of dimensions of a single Cartesian space. However, cases having variable scopes can be characterized in terms of a system of Cartesian spaces. In this regard, it should be understood that cases having variable scopes can be defined by a plurality of sub-cases having fixed scopes.

The following EXAMPLE 1 is provided for assisting a reader in understanding how a case having a variable scope can be characterized in terms of a system of Cartesian spaces. Embodiments of the present invention are not limited to the contents of EXAMPLE 1.

EXAMPLE 1

A complex case has a scope consisting of a shopping cart and items added to the shopping cart. A first sub-case of the complex case has a scope consisting of the shopping cart, a camcorder among the items added to the shopping cart, and a television among the items added to the shopping cart. A single attribute of the camcorder is to be utilized in the business rule project for making a decision for the first sub-case. The attribute includes the data format supported by the camcorder. Similarly, a single attribute of the television is to be utilized in the business rule project for making a decision for the first sub-case. The attribute of the television includes the screen size of the television.

The scope of the first sub-case is depicted in FIG. 1 as scope 102. As shown in FIG. 1, scope 102 can be defined by scopes 104 and 106. Each scope 104, 106 include less objects than scope 102. More particularly, scope 104 consists of a shopping cart and a camcorder. Scope 106 consists of a shopping cart and a television. Each scope 104, 106 can be defined by scope 108. Scope 108 consists only of a shopping cart, and therefore includes less objects than scopes 102, 104 and 106. Notably, scope 108 does not include a sufficient number and types of objects for making a determination as to whether or not discounts are available to the customer purchasing the items in the shopping cart. As such, scope 108 is not admissible for the given business rule project.

As shown in FIG. 1, there is a compositional relationship between scopes 102, 104, 106 and 108. In this regard, it should be understood that scopes 104 and 106 can be merged together to obtain scope 102. Conversely, scope 102 can be reduced to scopes 104, 106 and 108 by removing objects therefrom. Each of the scopes 104, 106, 108 is a sub-scope of scope 102.

Scope 108 cannot be characterized by a finite number of dimensions of a Cartesian space since no attributes of the object thereof are to be utilized in the business rule project for making a decision for the first sub-case. In contrast, each of the scopes 102, 104, 106 can be characterized by a finite number of dimensions of a Cartesian space since an attribute of at least one object thereof is to be utilized in the business rule project for making a decision for the complex case.

Figure 2:
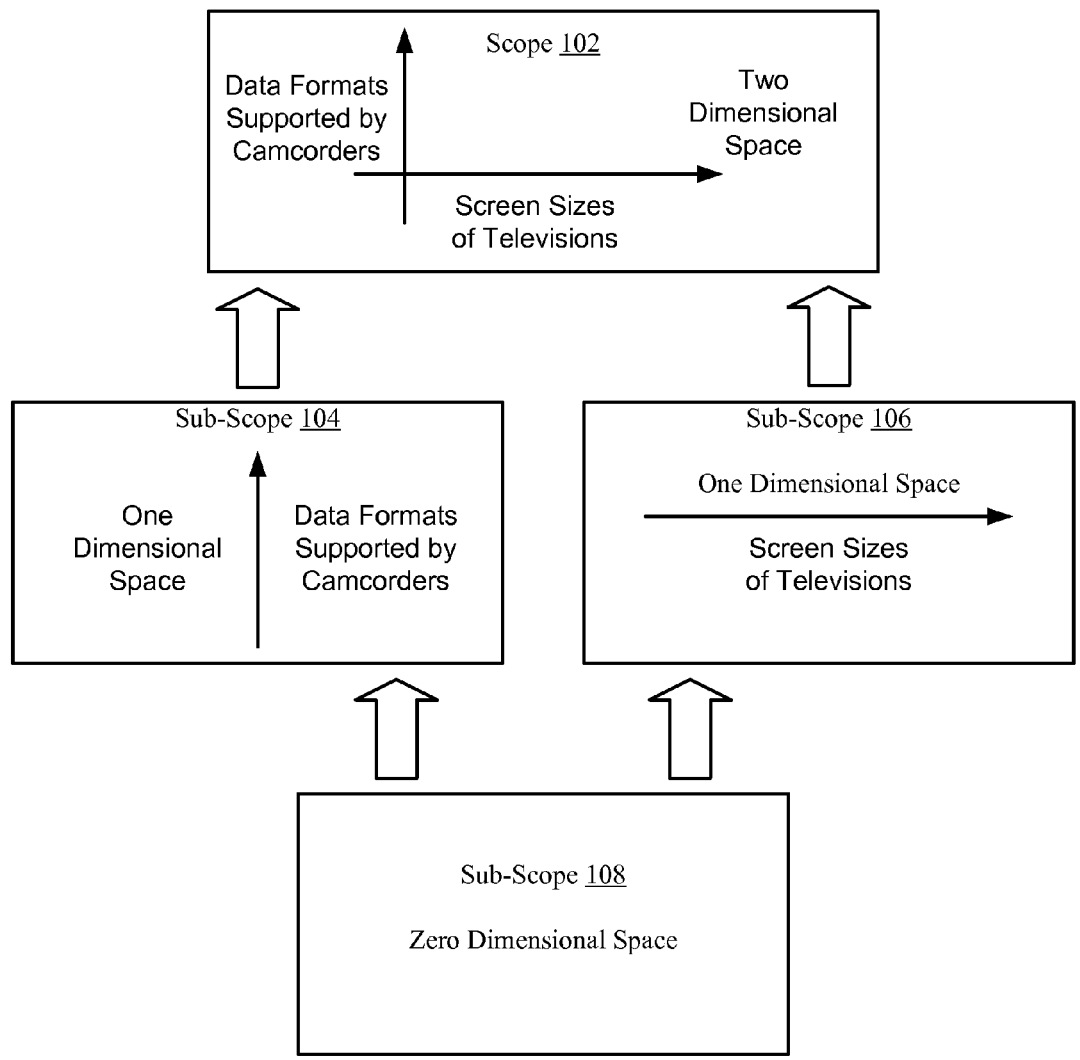
FIG. 2 is a schematic illustration of characterizations of the scope and sub-scopes of FIG. 1 in Cartesian spaces that is useful for understanding the present invention.

Schematic illustrations of the characterizations of scopes 102, 104, 106, 108 in Cartesian spaces is provided in FIG. 2. As shown in FIG. 2, scope 108 is defined in terms of a zero-dimensional space since no attributes of the object thereof (i.e., shopping cart) are to be utilized in the business rule project for making a decision for the first sub-case. Scopes 104 and 106 are each defined in terms of a one-dimensional space since an attribute of an object thereof is to be utilized in the business rule project for making a decision for the first sub-case. Scope 102 is defined in terms of a two-dimensional space since attributes of two objects thereof are to be utilized in the business rule project for making a decision for the first sub-case.

Sub-scopes can be used to generate business rules for making decisions for a sub-case. For example, the following BUSINESS RULE 1 makes a decision for a sub-case if two (2) conditions are met. More particularly, the business rule allocates fifty (50) bonus points to an account if a shopping cart includes a camcorder and the camcorder is an HD camcorder.

Business Rule 1
definitions
   set 'ShoppingCart1' to a shopping cart;
   set 'Product1' to a camcorder in the items of ShoppingCart1;
if
   the format of Product1 is "HD"
then
   set the bonus points of 'the shopping cart' to 50.
Embodiments of the present invention are not limited in this regard.

The above-provided BUSINESS RULE 1 is applicable only to sub-cases having fixed scopes or sub-scopes including objects defining the conditions of the business rule. For example, the above-provided BUSINESS RULE 1 is applicable to the first sub-case having fixed scope 102 and sub-scope 104. However, the above-provided BUSINESS RULE 1 is not applicable to sub-scope 106 of the first sub-case.

Therefore, at least one additional business rule is needed for making decisions for the first sub-case. The additional business rule can include the following BUSINESS RULE 2.

Business Rule 2
definitions
   set 'ShoppingCart1' to a shopping cart;
   set 'Product1' to a television in the items of ShoppingCart1;
if
   the screen size of Product1 is at least 50
then
   set the bonus points of 'the shopping cart' to 100.

The above-provided BUSINESS RULE 2 makes a decision for the complex case if two (2) conditions are met. More particularly, the BUSINESS RULE 2 allocates one hundred (100) bonus points to an account if a shopping cart includes a television and the television has a screen size equal to or greater than fifty inches (50"). Embodiments of the present invention are not limited in this regard.

Business rules can also be provided for making decisions relating to exceptional circumstances. For example, such a business rule can include the following BUSINESS RULE 3.

Business Rule 3
definitions
   set 'ShoppingCart1' to a shopping cart;
   set 'Product1' to a television in the items of ShoppingCart1;
   set 'Product2' to a camcorder in the items of ShoppingCart1;
if
   the screen size of Product1 is at least 50 and
   the format of Product2 is "HD"
then
   set the bonus points of 'the shopping cart' to 200.

The above-provided BUSINESS RULE 3 makes a decision for a sub-case if three (3) conditions are met. More particularly, the BUSINESS RULE 3 allocates two hundred (200) bonus points to an account if: a shopping cart includes a television and a camcorder; the television has a screen size equal to or greater than fifty inches (50"); and the camcorder is an HD camcorder. Notably, the business rule is applicable to the first sub-case having fixed scope 102 of FIG. 1. Embodiments of the present invention are not limited in this regard. In order to be effective, "exceptional circumstance" business rules are assigned a higher priority than other business rules for the corresponding sub-case.

A business rule project treats a sub-case if it contains at least one business rule that is applicable to the sub-case. A business rule project is incomplete if it is absent of at least one business rule for handling a decision relating to a sub-case within a complex case. Even if a business rule project has missing business rules, it may be complete for certain scopes of a complex case. For example, a business rule project includes BUSINESS RULE 1, BUSINESS RULE 3 and other business rules for making decisions when a camcorder of all types are added to a shopping cart. The business rule project is incomplete since it is absent of BUSINESS RULE 2, which can make decisions relating to sub-cases having scope 106. However, the business rule project is complete for scope 104. Embodiments of the present invention are not limited in this regard.

If treated sub-cases and missing sub-cases have the same scope, then it is possible to generate missing rules for the missing sub-cases using existing methods, such as those disclosed in European Patent Application No. EP 09172190. However, if only missing sub-cases have a particular scope, then the scope is considered to be a missing scope. In the missing scope scenario, missing rules cannot be generated using said existing methods. These concepts of missing rule generation will become more evident as the discussion progresses.

Figure 3:
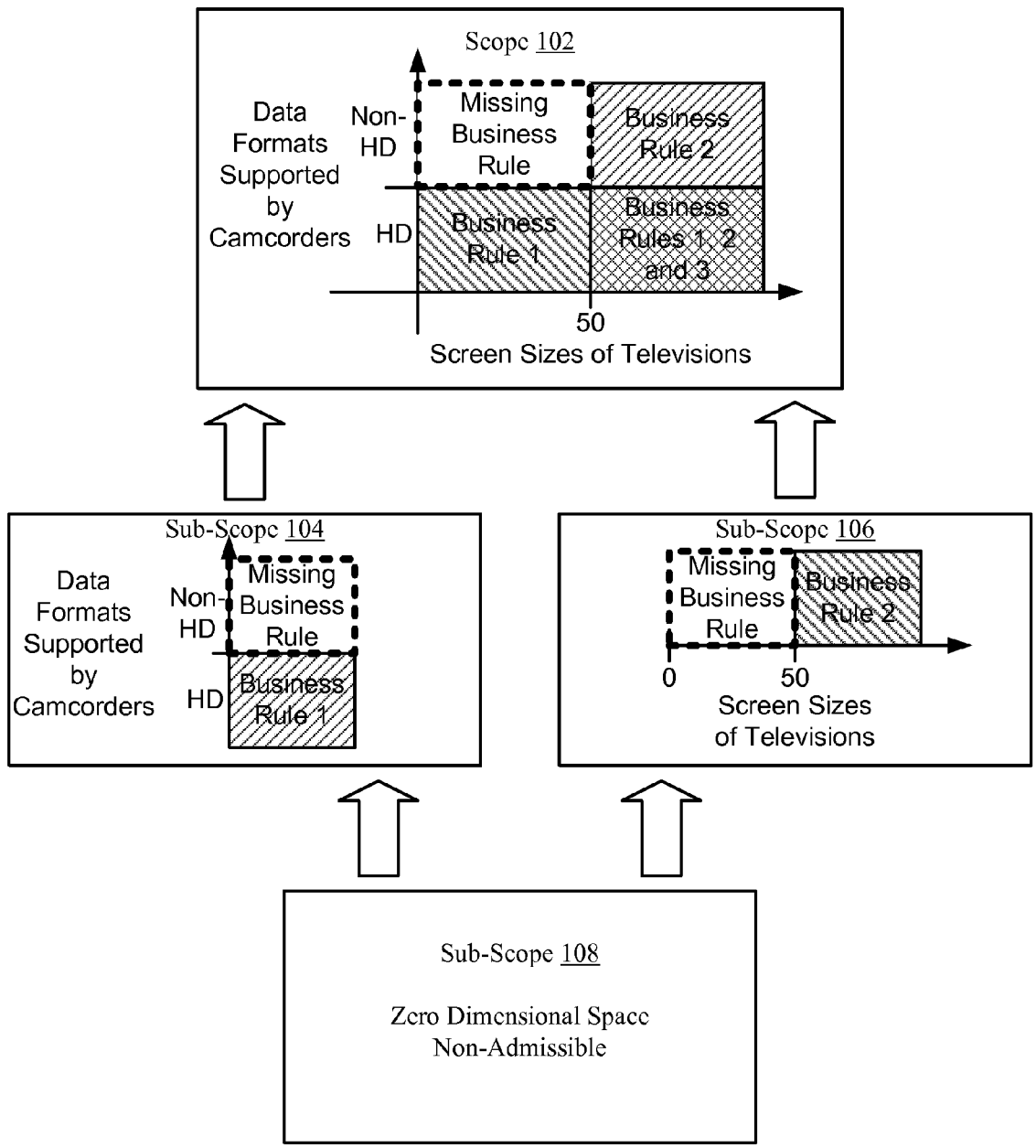
FIG. 3 is a schematic illustration of business rules and missing business rule of a business rule project treating the scope of FIGS. 1-2 that is useful for understanding the present invention.

An exemplary method for generating a missing rule will now be described in relation to FIG. 3. As shown in FIG. 3, BUSINESS RULE 1 of a business rule project treats sub-cases having scope 102 and scope 104. BUSINESS RULE 2 of a business rule project treats sub-cases having scope 102 and 106. BUSINESS RULE 3 of a business rule project treats sub-cases having scope 102.

As also shown in FIG. 3, a plurality of business rules are missing in the business rule project. For example, three (3) business rules are missing. A first business rule is missing that makes decisions for sub-cases in which shopping carts consist of non-HD camcorders. A second business rule is missing that makes decisions for sub-cases in which shopping carts consist of televisions with screen sizes less than fifty inches (50"). A third business rule is missing that makes decisions for sub-cases in which shopping carts consist of non-HD camcorders and televisions with screen sizes less than fifty inches (50"). Even if zero discounts or bonus points are to be awarded in the scenarios having missing business rules, it may be preferable to add business rules to a business rule project for awarding zero discounts and/or bonus points as they make the decision making process explicit. A complete description of the decision-making process has numerous advantages for decision management and decision making as it permits explanation generation or an informed change of business rules.

The above-identified existing methods can be employed to determine the missing rules of scopes 102, 104 and 106. For example, the missing rule associated with scope 102 is characterized by the fact that there is a shopping cart to which a television and a camcorder have been added. The missing business rule associated with scope 102 can include the following BUSINESS RULE 4.

Business Rule 4
definitions
   set 'ShoppingCart1' to a shopping cart;
   set 'Camcorder1' to a camcorder in the items of ShoppingCart1;
   set 'Television1' to a television in the items of ShoppingCart1;
if
   the format of Camcorder1 is not "HD" and
   the screen size of Television1 is less than 50
then
   <action>.

After the missing BUSINESS RULE 4 has been generated, it is added to the business rule project.

Although BUSINESS RULE 4 has been added to the business rule project, the business rule project is incomplete since BUSINESS RULE 4 does not make decisions in sceneries where a shopping cart includes only a non-HD camcorder or a television with a screen size less than fifty inches (50"). Completeness of the business rule project will only be achieved when missing business rules associated with scopes 104 and 106 are added thereto. The missing business rule associated with scope 104 can include the following BUSINESS RULE 5. The missing business rule associated with scope 106 can include the following BUSINESS RULE 6.

Business Rule 5
definitions
   set 'ShoppingCart1' to a shopping cart;
   set 'Camcorder1' to a camcorder in the items of ShoppingCart1;
   there is no television in the items of ShoppingCart1;
if
   the format of Camcorder1 is not "HD"
then
   <action>.

Business Rule 6
definitions
   set 'ShoppingCart1' to a shopping cart;
   set 'Television1' to a television in the items of ShoppingCart1;
   there is no camcorder in the items of ShoppingCart1;
if
   the screen size of Television1 is less than 50
then
   <action>.

Notably, BUSINESS RULE 5 and BUSINESS RULE 6 cannot be determined using the above-identified existing methods. The above-identified existing methods do not explain how to generate non-existence-conditions such as "there is no television in the items of ShoppingCart1" or "there is no camcorder in the items of ShoppingCart1".

The above-identified existing methods requires an enumeration of all scopes and the detection of missing rules associated with each scope. For relatively large business rule projects, the process for generating missing business rules is a costly process with an exponential number of missing business rules in an exponential number of scopes. For example, the above-described given business rule project can have business rules added thereto that treat other products (e.g., computers, printers and scanners). The business rules added to the business rule project ("the added business rules") make decisions for allocating bonus points to customer accounts in scenarios where a shopping cart includes one or more of the other products. Each of the added business rules has a similar form as BUSINESS RULE 1 and BUSINESS RULE 2. As such, each of the added business rules determines if a condition is met by matching a shopping cart and a single product in the shopping cart. Hence, if there are K products, the business rule project will contain K rules (plus BUSINESS RULE 3 which makes decisions relating to exceptional circumstances). In this scenario, the business rule project has two to the power of K (i.e., $2^K$) scopes. The business rule project also has missing rules for each of the $2^K$ scopes. This explosion of scopes for which business rules need to exist ("business rule scopes") is in sharp contrast with the capability of business rules to represent business policies in a compact form. Indeed, the explosion of business rule scopes annihilates the advantages of business rules to represent complex business policies in a compact form.

The reason for the explosion of the number of scopes is that the proposed missing rules are too specific. Whereas the original rules, such as BUSINESS RULE 1 and BUSINESS RULE 2, are applicable to sub-cases having scope 102 which is larger than scopes 104, 106, the missing BUSINESS RULES 5 and 6 are not applicable to sub-cases having scope 102. Indeed, the non-existence conditions of BUSINESS RULE 5 and BUSINESS RULE 6 prevent them from being applicable to sub-cases having scope 102.

BUSINESS RULE 5 and BUSINESS RULE 6 can be generalized by removing the non-existence conditions therefrom. The generalized business rules can include the following BUSINESS RULE 7 and BUSINESS RULE 8.

Business Rule 7
definitions
   set 'ShoppingCart1' to a shopping cart;
   set 'Camcorder1' to a camcorder in the items of ShoppingCart1;

if
   the format of Camcorder1 is not "HD"
then
   <action>.
Business Rule 8
definitions
   set 'ShoppingCart1' to a shopping cart;
   set 'Television1' to a television in the items of ShoppingCart1;
if
   the screen size of Television) is less than 50
then
   <action>.

Figure 4:
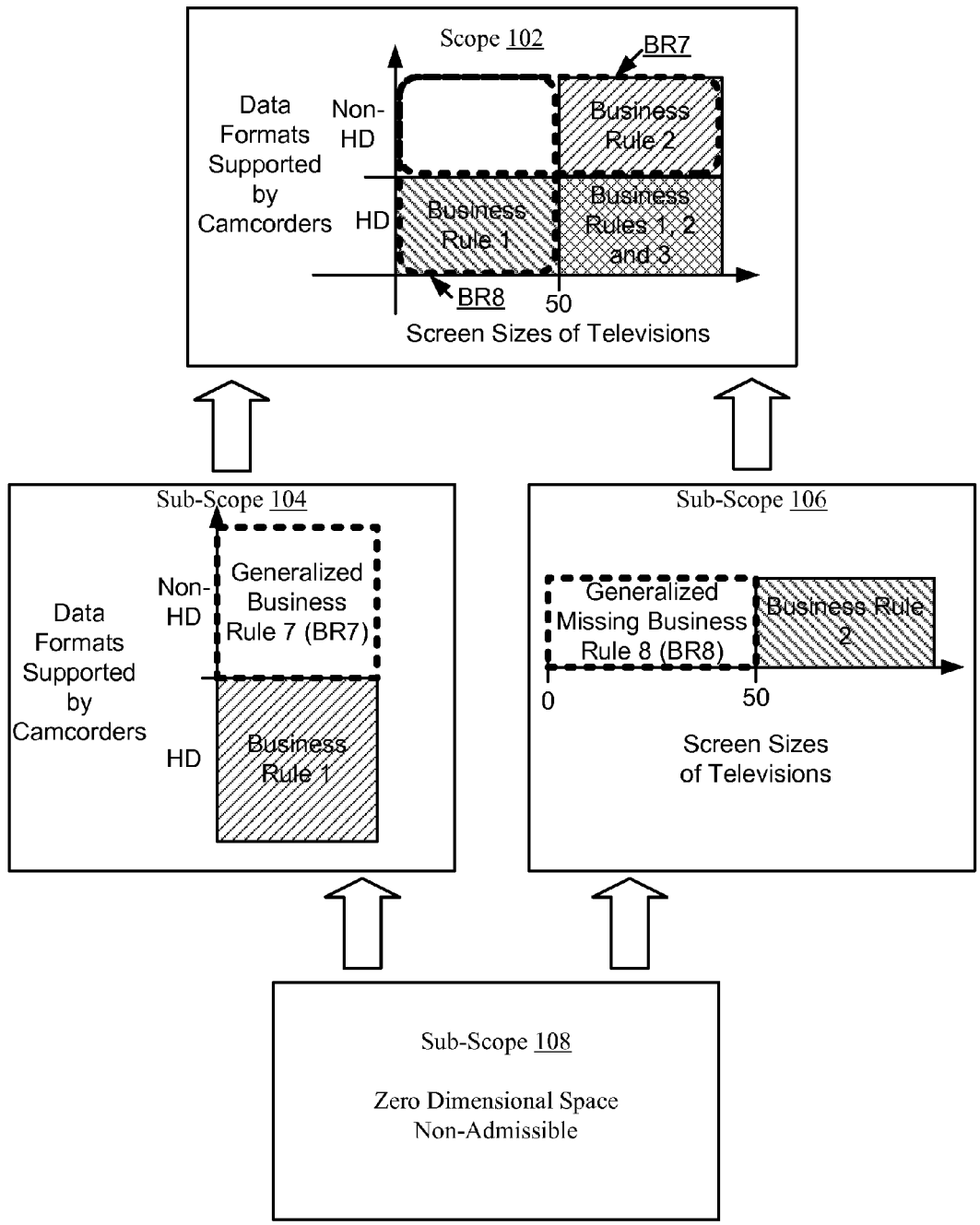
FIG. 4 is a schematic illustration showing generalized business rules capable of making decisions for cases having the scope and/or sub-scopes of FIGS. 1-2 that is useful for understanding the present invention.

As shown in FIG. 4, the generalized BUSINESS RULE 7 is applicable to sub-cases having scope 104 or scope 102. Similarly, generalized BUSINESS RULE 8 is applicable to sub-cases having scope 106 or scope 102. As such, each of the generalized business rules subsumes the missing rule associated with scope 102. Accordingly, the missing rule associated with scope 102 becomes redundant when missing rules of sub-scopes 104 and 106 are generalized.

If a business rule project is complete with regard to a scope (e.g., scope 104 or 106) and the business rules treating the scenarios within the scope are generalized, then the business rule project may also be complete for larger scopes (e.g. scope 102). As such, missing business rules associated with larger scopes are not needed for completing a business rule project. Hence, the business rule project does not need to include rules for making specific decisions for all specific scenarios covered by the scopes of sub-cases.

In view of the forgoing, it should be understood that the present invention concerns implementing systems and methods for identifying and generating missing business rules of the most-general scopes. The most-general scopes consist of minimal set of objects, and thus ensure that the missing business rules apply to as many scope scenarios and sub-scope scenarios as possible. For example, a missing rule associated with a first sub-scope (e.g., sub-scope 104) and a missing rule associated with second sub-scope (e.g., sub-scope 106) for a business rule project are identified and generated. However, a missing rule associated with a larger scope (e.g., scope 102) is not generated. As such, the present invention ensures that an explosion of the number of scopes of missing business rules will not occur during a missing business rule generation process.

The missing business rules, that are generated by the present invention, treat cases of larger scopes. Some of the cases treated by the missing business rules may also be treated by the original rules of a business rule project. For example, as shown in FIG. 4, generalized BUSINESS RULE 7 treats shopping carts containing a non-HD camcorder and a television having a screen size greater than fifty inches (50"). FIG. 4 also shows that the original BUSINESS RULE 2 already treats cases in which shopping carts containing a non-HD camcorder and a television having a screen size greater than fifty inches (50"). Such overlapping coverage of business rules is inevitable when business rules associated with different scopes are matching objects of a merged scope. The overlapping coverage occurs between: original business rules associated with different scopes; missing business rules associated with different scopes; and missing business rules and original business rules associated with different scopes. The present invention allows overlaps in coverage between a missing business rule and an original business rule if the original business rule matches at least one object that is not matched by the missing business rule. A missing business rule must not overlap with an original business rule if the original business rule has the same scope or a smaller scope.

Discussion of Method Embodiments of the Present Invention

Figure 5:
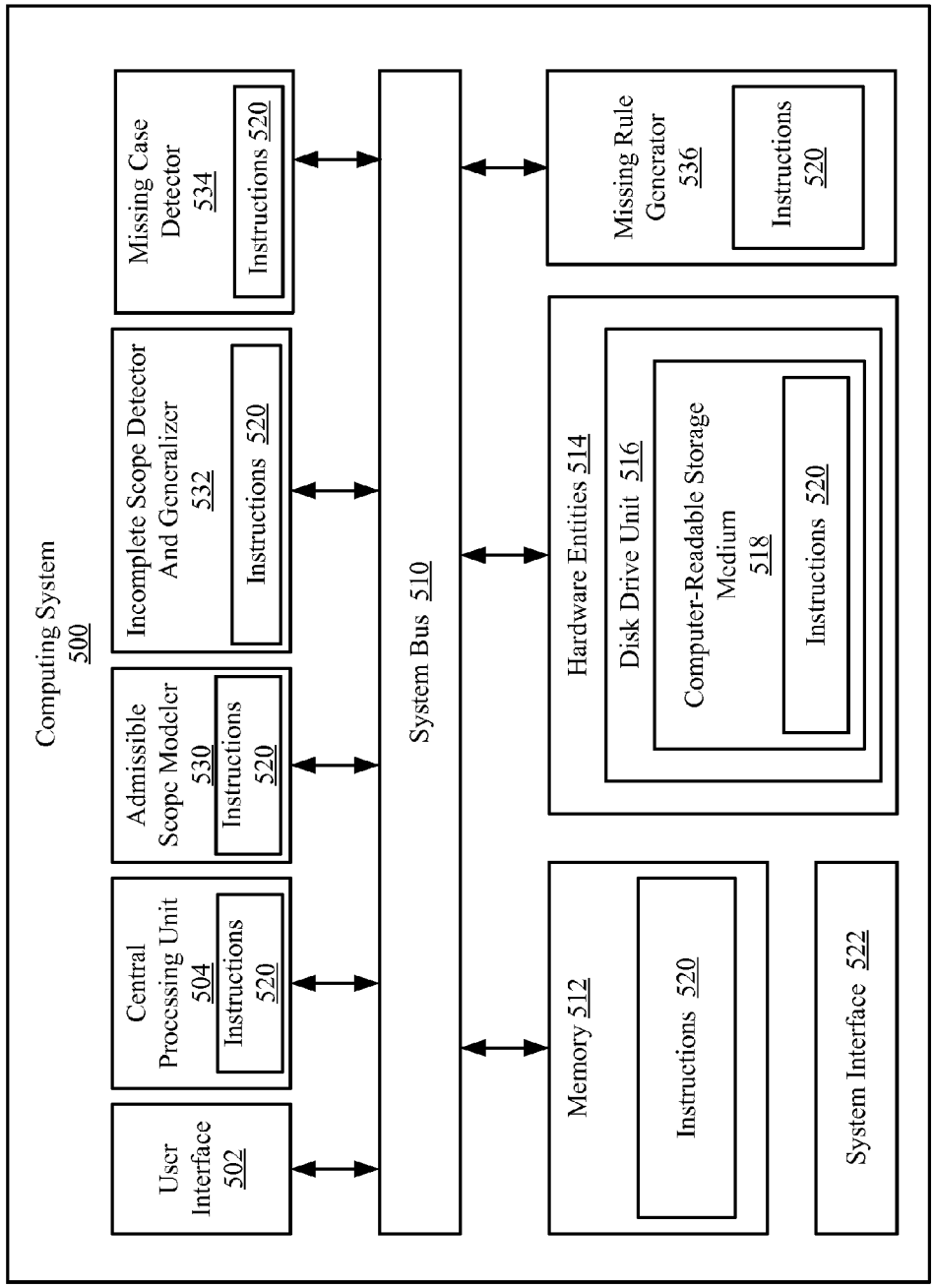
FIG. 5 is a block diagram of an exemplary computing system that is useful for understanding the present invention.

Referring now to FIG. 5, there is provided a block diagram of an exemplary computing system 500 implementing the present invention. In this regard, the computing system 500 is generally configured for generating missing business rules for treating cases having most-general scopes. As such, the computing system 500 comprises a plurality of components 502-522 and 530-536. The computing system 500 can include more or less components than those shown in FIG. 5. However, the components shown are sufficient to disclose an illustrative embodiment implementing the present invention.

The hardware architecture of FIG. 5 represents one (1) embodiment of a representative computing device configured for automatically generating missing business rules for treating cases having the most-general scopes. As such, the computing system 500 implements method embodiments of the present invention. Exemplary method embodiments will be described in detail below in relation to FIGS. 15-19.

As shown in FIG. 5, the computing system 500 includes a system interface 522, a user interface 502, a Central Processing Unit (CPU) 504, a system bus 510, a memory 512 connected to and accessible by other portions of the computing system 500 through system bus 510, and hardware entities 514 connected to system bus 510. At least some of the hardware entities 514 perform actions involving access to and use of memory 512, which can be a Random Access Memory (RAM), a disk driver and/or a Compact Disc Read Only Memory (CD-ROM). The computing system 500 also comprises an Admissible Scope Modeler (ASM) 530, an Incomplete Scope Detector and Generalizer (ISDG) 532, a Missing Case Detector (MCD) 534 and a Missing Rule Generator (MRG) 536. Each of the components 530-536 can be implemented in hardware, software or a combination thereof. System interface 522 allows the computing system 500 to communicate directly or indirectly with external devices (e.g., servers and client computers).

Hardware entities 514 can include microprocessors, Application Specific Integrated Circuits (ASICs) and other hardware. Hardware entities 514 can include a microprocessor programmed for facilitating the provision of business rule based services to users of the computing system 500. The services can include, but are not limited to, admissible scope modeling, incomplete scope detection, incomplete scope generalization, missing case detection, missing rule identification, missing rule generation and missing rule report generation. In this regard, it should be understood that the microprocessor can access and run admissible scope modeling applications, incomplete scope detection applications, incomplete scope generalization applications, missing case detection applications, missing rule identification applications, missing rule generation applications and other types of applications installed on the computing system 500. The operations of the above-listed applications will become evident as the discussion progresses.

As shown in FIG. 5, the hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512, the CPU 506, ASM 530, ISDG 532, MCD 534 and/or MRG 536 during execution thereof by the computing system 500. The components 512, 506, 530, 534 and/or 536 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 320 for execution by the computing system 500 and that cause the computing system 500 to perform any one or more of the methodologies of the present disclosure.

The ASM 530, ISDG 532, MCD 534 and MRG 536 interact with each other in such a way that a missing business rule generation process is focused to a most-general scope. Missing business rules generated during said process are associated with a most general scope. As such, the missing business rules may overlap with original business rules applicable to scenarios covered by scopes that include at least one object outside the scope of the missing business rules. The interactions between the components 530, 532, 534, 536 will be described below in relation to FIG. 6.

Figure 6:
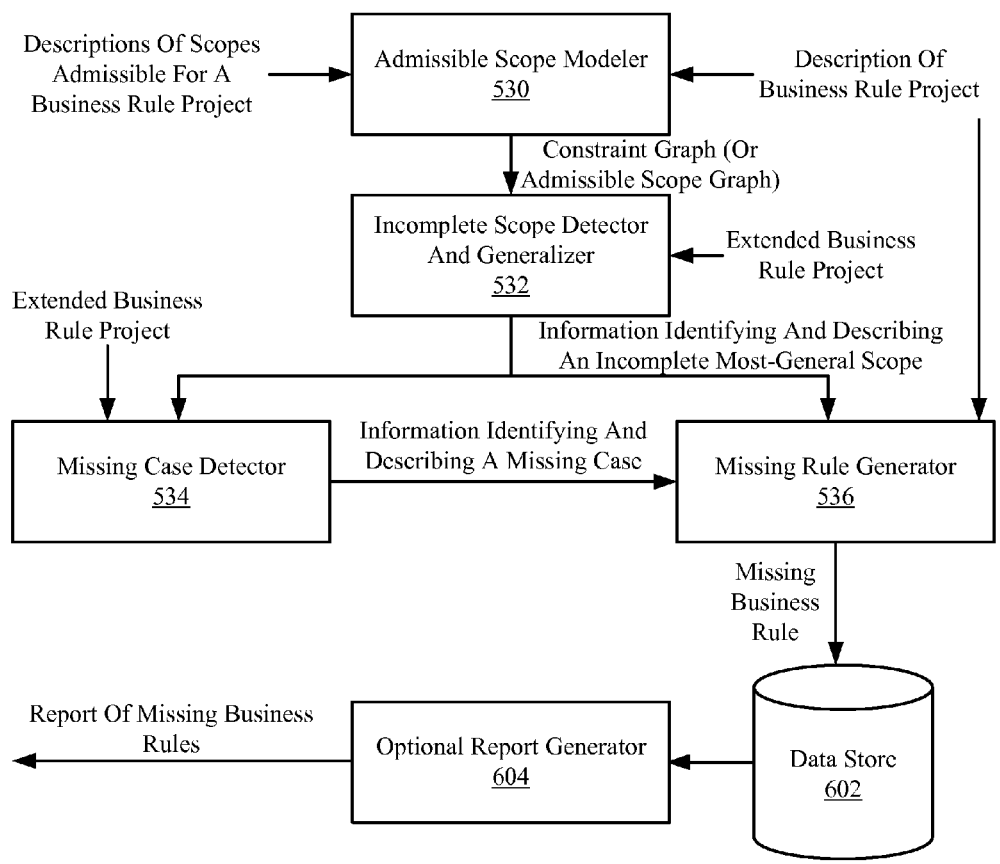
FIG. 6 is a schematic illustration showing the interaction of various components of the computing system of FIG. 5 that is useful for understanding the present invention.

Referring now to FIG. 6, there is provided a schematic illustration of the interactions between components 530, 532, 534, 536 of FIG. 5. As shown in FIG. 6, ASM 530 has two (2) inputs. A first input includes information describing scopes that are admissible for a business rule project (i.e., concern a sufficient number of objects for making a decision with regard to a scope or sub-scope of a sub-case within a complex case). Each of the scope descriptions includes information specifying the number and types of objects defining a scope. The scope descriptions can also include information specifying the structural relationship between the objects. For example, a scope description can include, but is not limited to, the following SCOPE DESCRIPTION 1.

Scope Description 1
1 Shopping Cart
1 Television added to the shopping cart
1 Camcorder added to the shopping cart A second input includes information describing the business rule project. Such information includes, but is not limited to, information defining a set of business rules. Exemplary business rules are provided above.

After receiving the two (2) inputs, the ASM 530 generates an expanded set of scope descriptions by adding descriptions of the scopes covered by the business rule project to the scope descriptions of the first input. Subsequent to generating the expanded set of scope descriptions, the ASM 530 produces an implicit description of the scopes described by the expanded set of scope descriptions. The implicit description is in the form of a constraint graph. Constraint graphs are well known to persons having ordinary skill in the art, and therefore will not be described herein. The constraint graph is referred to herein as an "admissible scope graph". The admissible scope graph is then communicated from ASM 530 to ISDG 532.

At ISDG 532, the admissible scope graph is used to identify at least one most-general scope that covers a case which is not treated by a business rule of the business rule project. The identified case is referred to herein as a "missing case" of a most-general scope. For example, a most-general scope is defined by the following objects: a shopping cart; and a camcorder added to the shopping cart. An attribute of the camcorder is to be used for determining if bonus points are to be awarded to a customer. The attribute is selected to include the format supported by the camcorder. The format is specified as an HD format and a non-HD format. A business rule exists in the business rule project that is capable of making a decision in scenarios where a shopping cart includes an HD camcorder. However, a business rule does not exist within the business rule project that is capable of making a decision in scenarios where a shopping cart includes a non-HD camcorder. As such, the most-general scope is an incomplete scope ("a most-general incomplete scope"). Embodiments of the present invention are not limited in this regard.

For identifying a most-general incomplete scope, the ISDG 532 can perform a check to see if an extended business rule project includes any business rules for making decisions in cases of the most-general incomplete scope. The extended business rule project includes original business rules and missing business rules which have been previously generated by the MRG 536. If all cases of the most-general incomplete scope is treated by the extended business rule project, then the ISDG 532 re-starts its operations, i.e., the ISDG 532 uses the implicit description to identify another most-general incomplete scope. However, if one or more cases of the most-general scope are not treated by the extended business rule project, then the ISDG 532 communicates information identifying the most-general scope to the MCD 534 and MRG 536.

At MCD 534, operations are performed to identify a case of the most-incomplete scope that is not treated by a business rule of a business rule project. The identified case is referred to herein as "a missing case". Information identifying and describing the missing case is then communicated from MCD 534 to MRG 536. MRG 536 generates a generalized missing business rule using the description of the missing case and a description of the incomplete most-general scope.

Figure 7:
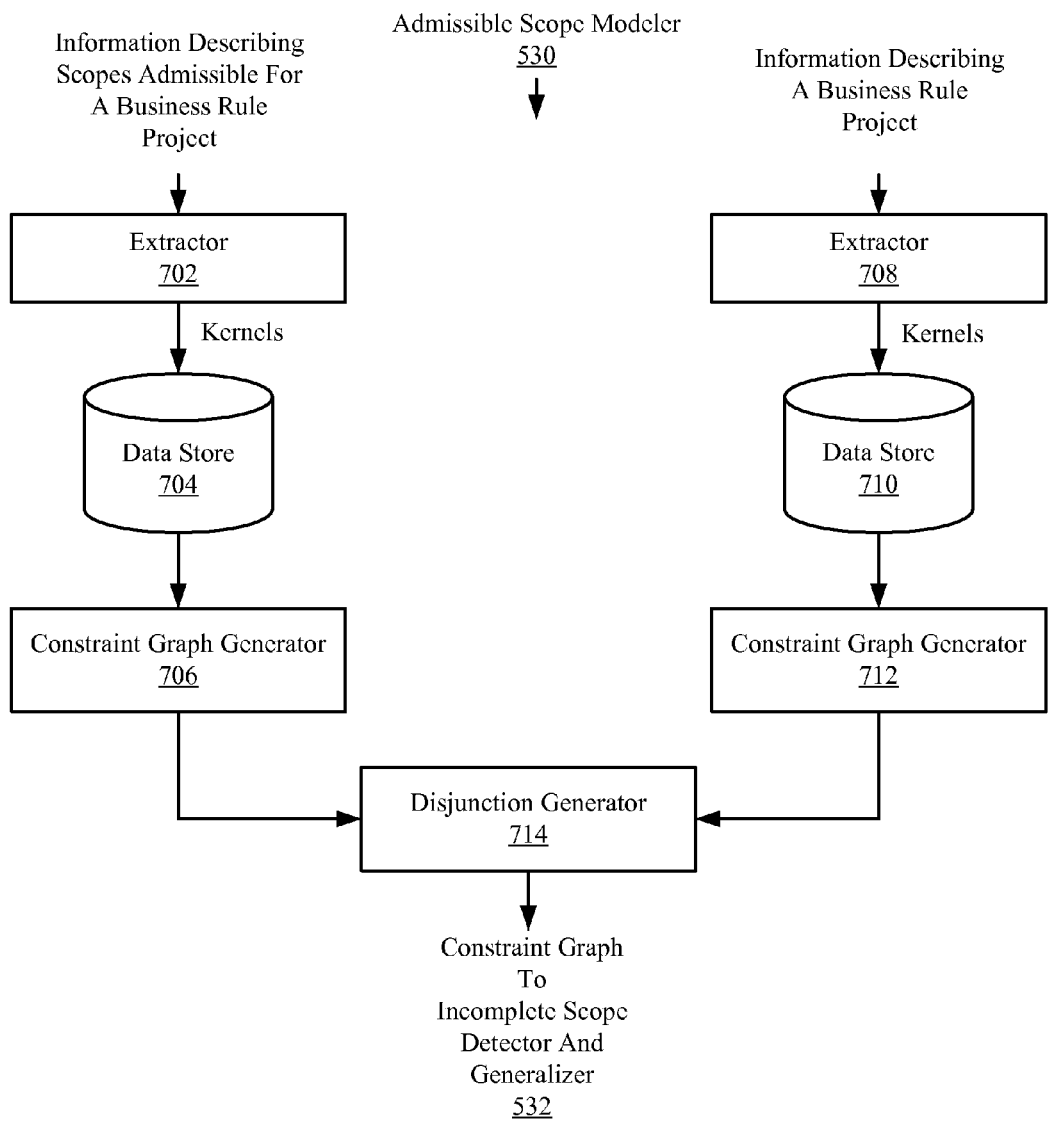
FIG. 7 is a detailed block diagram of an exemplary admissible scope modeler that is useful for understanding the present invention.

Referring now to FIG. 7, there is provided a more detailed block diagram of ASM 530. As shown in FIG. 7, ASM 530 comprises extractors 702, 708, data stores 704, 710, Constraint Graph Generators (CGG) 706, 712 and a disjunction generator 714. As noted above, ASM 530 is configured to receive two (2) inputs. The inputs include information describing scopes that are admissible for a business rule project and information describing the business rule project. The input information can be in the form of a set of kernels. The term "kernel", as used herein, refers to a list of objects defining a scope which may be incomplete, i.e., the scope may contain objects which are not identified in a kernel. In this scenario, each of the extractors 702, 708 is a kernel extractor.

As shown in FIG. 7, the extractor 702 is configured to receive a set of first kernels describing admissible scopes. More particularly, each first kernel describes how many objects of each type define a respective one of the admissible scopes. For example, a first kernel may specify that there is at least one shopping cart in an admissible scope. The type can be a basic type such as the shopping-cart-type which is listed in an object model of a business rule project or a defined type. A defined type is characterized by a root object of a more elementary type and a path in the object model. For example, the first kernel may specify that there is one (1) television in the items of the before-mentioned shopping cart. Hence, the defined type is that of all televisions in the items of the shopping cart. The first kernel specifies that the admissible scope contains at least one (1) instance of said defined type. Embodiments of the present invention are not limited in this regard. A scope is admissible if it is described by at least one first kernel. Stated differently, the scope includes all objects of at least one kernel.

Upon receiving the set of first kernels, the extractor 702 extracts all first kernels from the set of first kernels. The extracted first kernels are then communicated from the extractor 702 to the data store 704.

At some later time, CGG 706 retrieves the first kernels from the data store 704. CGG 706 processes to the first kernels for purposes of building an implicit description of each scope described by the first kernels. The implicit description of a scope has the form of a constraint graph. The constraint graph shows the objects, the type membership of the objects, and the structural relationships between the objects. Subsequent to generating the constraint graphs, the CGG 706 communicates the constraint graphs to the disjunction generator 714.

Figure 8:
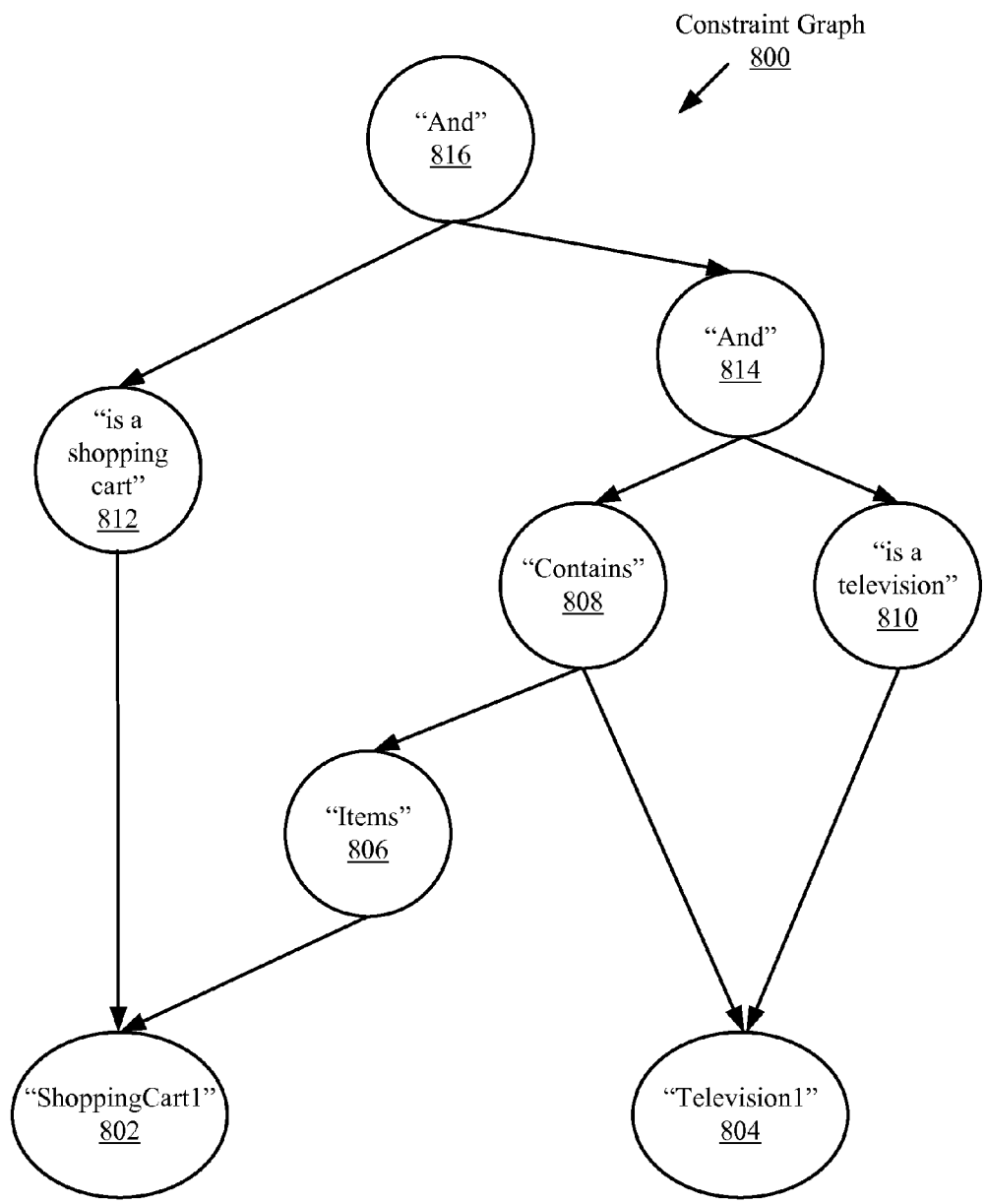
FIG. 8 is a schematic illustration of an exemplary constraint graph that is useful for understanding the present invention.

An exemplary constraint graph 800 generated by CGG 706 is provided in FIG. 8. As shown in FIG. 8, the objects are represented in the constraint graph 800 by leaf nodes 802, 804 labeled with distinct object names. Leaf node 802 is labeled with distinct object name "ShoppingCart1". Lead node 804 is labeled with distinct object name "Television1". Each of the nodes 810, 812 in the constraint graph 800 represents the membership of an object represented by it's child node 802, 804 to an indicated type. Node 810 is labeled with a type membership predicate "is a television". Node 812 is labeled with a type membership predicate "is a shopping cart". Node 806 represents a value of an attribute for an object represented by it's child node 802. Node 806 is labeled "items". Nodes 808 represents a containment relationship between the collection represented by it's left child node 806 and the object represented by its right child node 804. Node 808 is labeled "contains". Each of the nodes 814, 816 represent conjunctions of the propositions that are represented by their child nodes 812/814 or 808/810. Nodes 814, 816 are each labeled "and".

Although not shown in FIG. 8, it should be understood that nodes labeled with an "or" represent disjunctions of the propositions that are represented by their child nodes. If there are multiple objects of same type such as "Television1", "Television2" and "Television3" in the items of the shopping cart, disequality constraints of the form "Television1 is different to Television2", "Television1 is different to Television3" and "Television2 is different to Television3" may be added to the constraint graph to ensure that all the objects are different.

Referring again to FIG. 7, the extractor 708 is configured to receive a set of second kernels describing business rules of a business rule project. The second kernels have the same form as the first kernels. In this regard, the second kernels express how many objects of which type occur at least in the scope of a case treated by a business rule of the business rule project.

Upon receiving the information describing a business rule project, the extractor 708 extracts all second kernels therefrom. The second kernels correspond to the scopes of the business rules for the business rule project. The extracted second kernels are then communicated from the extractor 708 to the data store 710.

At some later time, CGG 712 retrieves the second kernels from the data store 710. CGG 712 processes to the second kernels for purposes of building an implicit description of each scope of cases treated by the business rules described by the second kernels. The implicit description of each scope has the form of a constraint graph. The constraint graph shows the objects, the type membership of the objects, and the structural relationships between the objects. Subsequent to generating the constraint graphs, the CGG 712 communicates the constraint graphs to the disjunction generator 714.

At the disjunction generator 714, the constraint graphs are processed to produce a scope constraint graph representing all admissible scopes for a business rule project. The scope constraint graph is generated by building the disjunctions of the constraint graphs received from CGGs 706, 712. The term "disjunction", as used herein, refers to a proposition that is true if one of the disjuncts is true and it is false if all the disjuncts are false.

Figure 9:
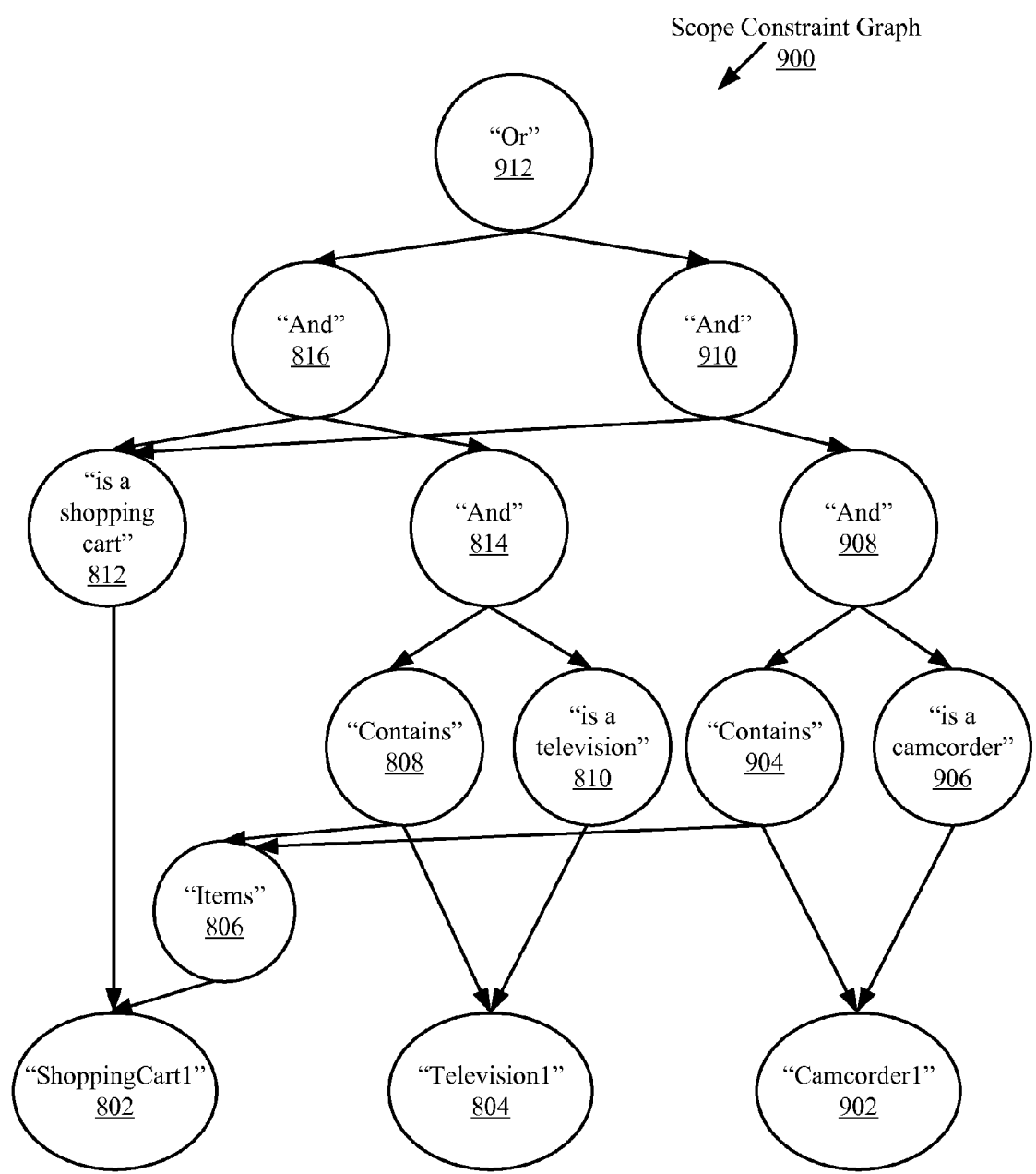
FIG. 9 is a schematic illustration of an exemplary scope constraint graph that is useful for understanding the present invention.

A schematic illustration of an exemplary scope constraint graph 900 generated by disjunction generator 714 is provided in FIG. 9. Scope constraint graph 900 is generated if the first and/or second kernels contain: a kernel specifying that a scope contains at least one shopping cart and one (1) television among the items of the shopping cart; and a kernel specifying that a scope contains at least one shopping cart and one (1) camcorder among the items of this shopping cart.

The scope constraint graph is then output from the disjunction generator 714 to ISDG 532. The ISDG 532 labels the nodes of the scope constraint graph in a way that respects the operations represented by the nodes. The scope constraint graph is also referred to herein as an "admissible scope graph".

Figure 10:
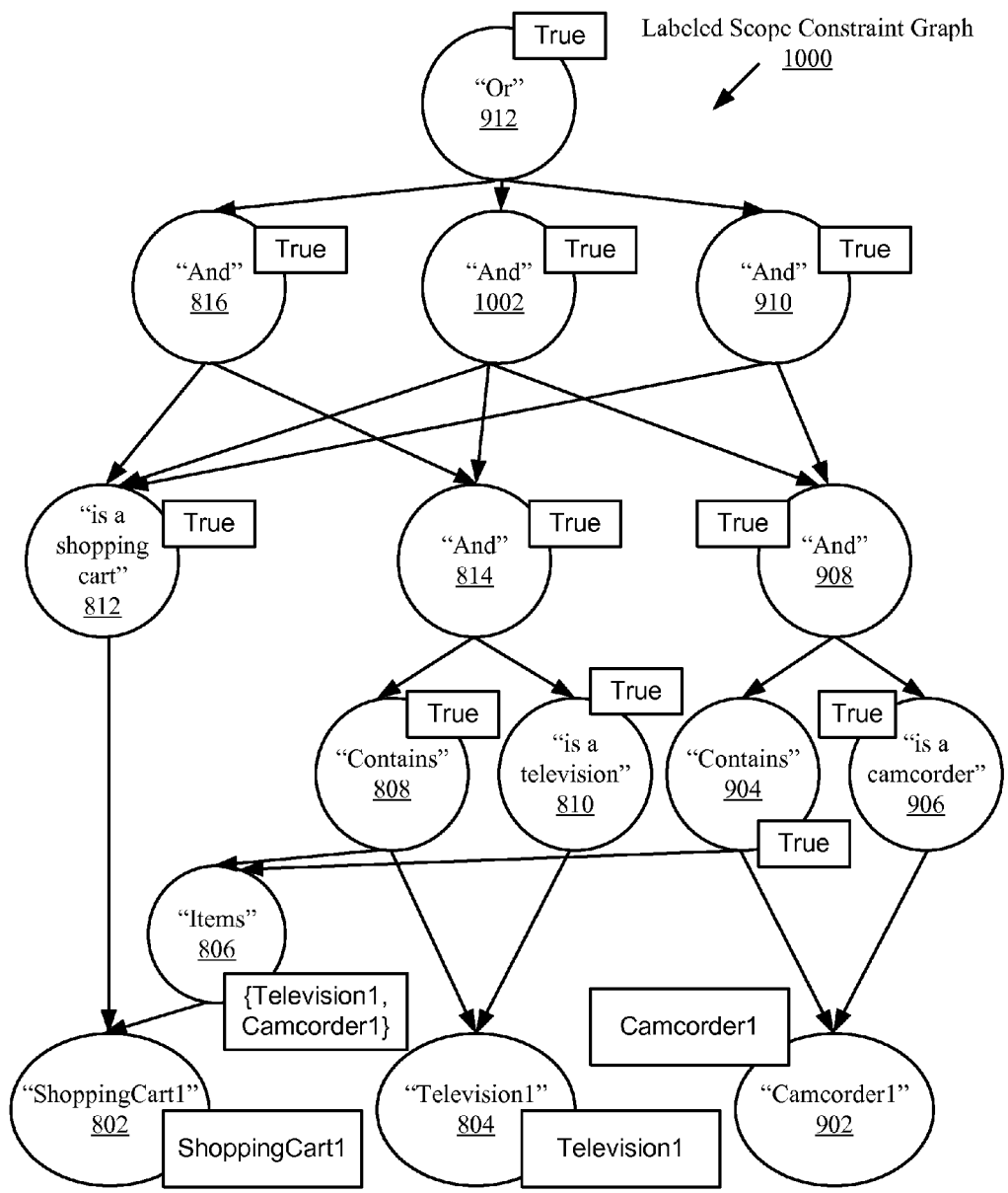
FIG. 10 is a schematic illustration of an exemplary labeled scope constraint graph that is useful for understanding the present invention.

A schematic illustration of an exemplary labeled scope constraint graph 1000 is provided in FIG. 10. As shown in FIG. 10, node 812 is labeled with "true" since it's child node 802 is labeled with a shopping cart. Each of the nodes 814, 816, 1002, 908, 910 is labeled by the conjunction of the truth values of its child nodes 808/810, 904/906, 812/814, 812/814/908 or 812/908. A scope satisfies the scope constraint graph 1000 if the root node 912 of the scope constraint graph 1000 is labeled with "true".

The set of first kernels provides information that is necessary to identify missing scopes, i.e., admissible scopes that do not contain any treated cases. For example, a business rule project consists of the above-provided BUSINESS RULE 1. The business rule project has admissible scopes represented by the constraint graph 900 of FIG. 9. Constraint graph 900 illustrates that: a first admissible scope contains at least one shopping cart and a television among the items of the shopping cart; and a second admissible scope includes at least one shopping cart and a camcorder among the items of the shopping cart. Since the business rule project is absent of a business rule for treating a case having a scope consisting of a shopping cart and a television among the items of the shopping cart, the business rule project is incomplete. The scope of the un-treated case is a missing scope. In this scenario, the present invention is able to identify the missing scope based on the constraint graph 1000 of FIG. 10. Embodiments of the present invention are not limited in this regard.

Hence, the set of first kernels includes essential information if the existing business rules do not reflect the admissible scopes. As the set of first kernels represents additional information, this information may itself be incomplete or not be available in all circumstances. It may even be difficult to assume that the set of first kernels defines the scopes of cases that are treated by the business rules of the business rule project. ASM 530 addresses these difficulties by completing the scope constraint graph (e.g., scope constraint graph 900 of FIG. 9) with the scopes of cases treated by the business rules of the business rule project ("rule scopes"), as described above. Consequently, ASM 530 produces a scope constraint graph for the rule scopes which has the same form as the scope constraint graph for the admissible scopes.

Figure 11:
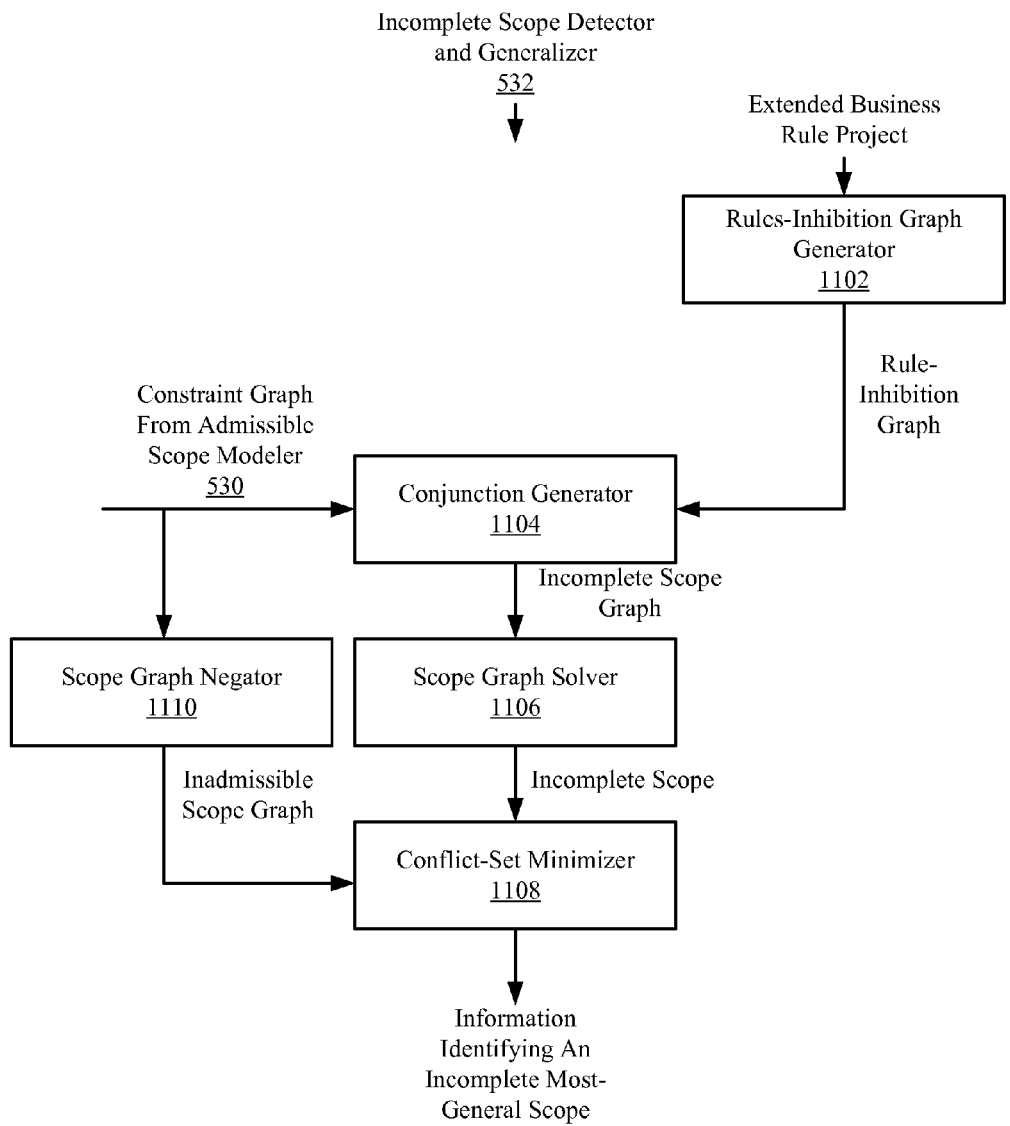
FIG. 11 is a detailed block diagram of an exemplary incomplete scope detector and generalizer that is useful for understanding the present invention.

Referring now to FIG. 11, there is provided a detailed block diagram of the ISDG 532. ISDG 532 is generally configured for determining an incomplete scope among the admissible scopes for a business rule project. As such, ISDG 532 comprises a Rules-Inhibition Graph Generator (RIGG) 1102, a conjunction generator 1104, a Scope Graph Solver (SGS) 1106, a Scope Graph Negator (SGN) 1110 and a conflict-set minimizer 1108.

RIGG 1102 is configured for generating a rules-inhibition graph including information representing the missing cases. Methods for generating a rule-inhibition graph are known in the art. Any such method can be used with the present invention without limitation. One such method is described in European Patent Application No. EP 09172190. As explained in said European Patent Application, a rules-inhibition graph can be generated by traversing all the business rules in the extended business rule project. In this regard, RIGG 1102 negates the condition of each business rule. The negated conditions are then put inside universal quantifiers so as to ensure that a rule is non-applicable for all possible combinations of objects that are matched by the business rule. The rule-inhibition graph is then created using the universal quantifiers. The rule-inhibition graph is then communicated from RIGG 1102 to conjunction generator 1104.

Conjunction generator 1104 generates an incomplete scope graph representing incomplete admissible scopes. The incomplete scope graph is generated by building a conjunction of the rules-inhibition graph and the constraint graph received from ASM 530 (i.e., the admissible scope graph). The incomplete scope graph includes information representing incomplete admissible scopes. The incomplete scope graph is then communicated from the conjunction generator 1104 to SGS 1106.

SGS 1106 identifies incomplete scopes by performing logical and constraint solving methods to either determine a labeling that solves the incomplete scope graph or a proof stating that no such labeling exists. Such logical and constraint solving methods are well known to persons skilled in the art, and therefore will not be described herein. However, it should be understood that a labeling solves an incomplete scope graph if it labels a root node with true and it respects the operations represented by the inner nodes of the incomplete scope graph. The incomplete scopes are then communicated from SGS 1106 to the conflict-set minimizer 1108.

SGN 1110 is configured to generate an inadmissible scope graph. The inadmissible scope graph is generated using the constraint graph received from ASM 530. The manner in which the inadmissible scope graph is generated will become more apparent as the discussion progresses. The inadmissible scope graph is then communicated from SGS 1106 to the conflict-set minimizer 1108.

At the conflict-set minimizer 1108, the incomplete scopes and inadmissible scope graph are analyzed for purposes of identifying at least one incomplete most-general scope. The manner in which the incomplete most-general scope is identified by conflict-set minimizer 1108 will become more apparent as the discussion progresses. Information identifying the incomplete most-general scope is then communicated from conflict-set minimizer 1108 to MSD 534 and MRG 536.

The following EXAMPLE 2 is provided for purposes of explaining in more detail the operations performed by ISDG 532. Embodiments of the present invention are not limited to the contents of EXAMPLE 2.

EXAMPLE 2

A business rule project is absent of business rules treating cases having certain scopes. Accordingly, a plurality of incomplete scopes exist. The business rule project includes BUSINESS RULES 1, 2 and 3.

During operation, SGS 1106 receives an incomplete scope graph from conjunction generator 1104. At SGS 1106, analyzes the incomplete scope graph to find a labeling that solves the incomplete scope graph. FIG. 10 shows the part of this labeling that concerns the admissible scope graph. The part concerning the rules-inhibition graph is omitted from FIG. 10 for the sake of readability.

SGS 1106 inspects the truth values of all nodes of the incomplete scope graph that represent atomic formulae. The phrase "atomic formulae", as used herein, refers to boolean expressions, such as "Television1 is a television" and "the items of ShoppingCart1 contain Television)". The phrase "atomic formulae" does not refer to disjunctions, conjunctions, and negations. If a node is labeled by "true", SGS 1106 extracts the boolean expression represented by the node. If the node is labeled by "false", SGS 1106 extracts the boolean expression represented by the node and negates the boolean expression. As a result of the truth value processing, a set of boolean expressions describing the incomplete scope is obtained. For example, the following BOOLEAN EXPRESSIONS is obtained.

Boolean Expressions
ShoppingCart1 is a shopping cart
Television1 is a television
the items of ShoppingCart1 contain Television1
Camcorder1 is a camcorder
the items of ShoppingCart1 contain Camcorder1

The incomplete scope described by BOOLEAN EXPRESSIONS includes a missing case. The missing case is represented by the following labeling of the rules-inhibition graph.
the format of Camcorder1 is not "HD"
the screen size of Television1 is less than 50

Notably, ISDG 532 ignores the information about the missing case and just uses the description of the incomplete scope in its further steps. It should also be noted that the detected incomplete scope and missing case leads to the following MISSING RULE.

Missing Rule
definition
   set 'ShoppingCart1' to a shopping cart;
   set 'Camcorder1' to a camcorder in the items of ShoppingCart1;
   set 'Television1' to a television in the items of ShoppingCart1;
if
   the format of Camcorder1 is not "HD" and
   the screen size of Television1 is less than 50
then
   <action>.

MISSING RULE treats missing cases within a relatively large scope (e.g., scope 102 of FIGS. 1-4). As such, MISSING RULE is too specific.

In order to avoid the generation of such a specific missing rule, conflict-set minimizer 1108 generalizes the detected incomplete scope into an incomplete most-general scope prior to the generation of a missing rule by MRG 536. In this regard, conflict-set minimizer 1108 analyzes the incomplete scope to identify a more general scope which (a) contains less objects than the incomplete scope, (b) is still admissible and (c) is incomplete.

If an admissible scope "s" is complete, then all larger scopes "S" (i.e., more specific admissible scopes) are complete as well. In this regard, it should be understood that the case having scope "S" can be reduced to a sub-case having scope "s" simply by removing all objects that are in scope "S", but not in the scope "s". As scope "s" is complete, the business rule project contains a business rule "BR" that treats the sub-case. The present invention only considers business rules that, when treating a case, also treat all larger cases. Hence, the business rule "BR" not only treats the sub-case, but also the larger case having the specific scope "S". Consequently, the more specific scope "S" is complete as well. Hence, if an admissible scope is complete, all larger scopes are complete as well. If an admissible scope is incomplete, then all smaller scopes (i.e., more general admissible scopes) are incomplete as well. Based on these properties, conflict-set minimizer 1108 simply seeks some most-general admissible scope that is a sub-scope of the detected incomplete scope.

The conflict-set minimizer 1108 finds a most-general admissible scope by identifying a minimal set of elements of the BOOLEAN EXPRESSIONS that are sufficient to establish an admissible scope. Such a set of tests is sufficient to establish an admissible scope if there is no inadmissible scope that satisfies all these tests. For example, the conflict-set minimizer 1108 examines the following five (5) tests T1, T2, T3, T4, T5 using the BOOLEAN EXPRESSIONS.

T1: ShoppingCart1 is a shopping cart
T2: Television1 is a television
T3: the items of ShoppingCart1 contain Television1
T4: Camcorder1 is a camcorder
T5: the items of ShoppingCart1 contain Camcorder1
Tests T1, T2 and T3 collectively meet the definition of an admissible scope of the business rule project.

Figure 12:
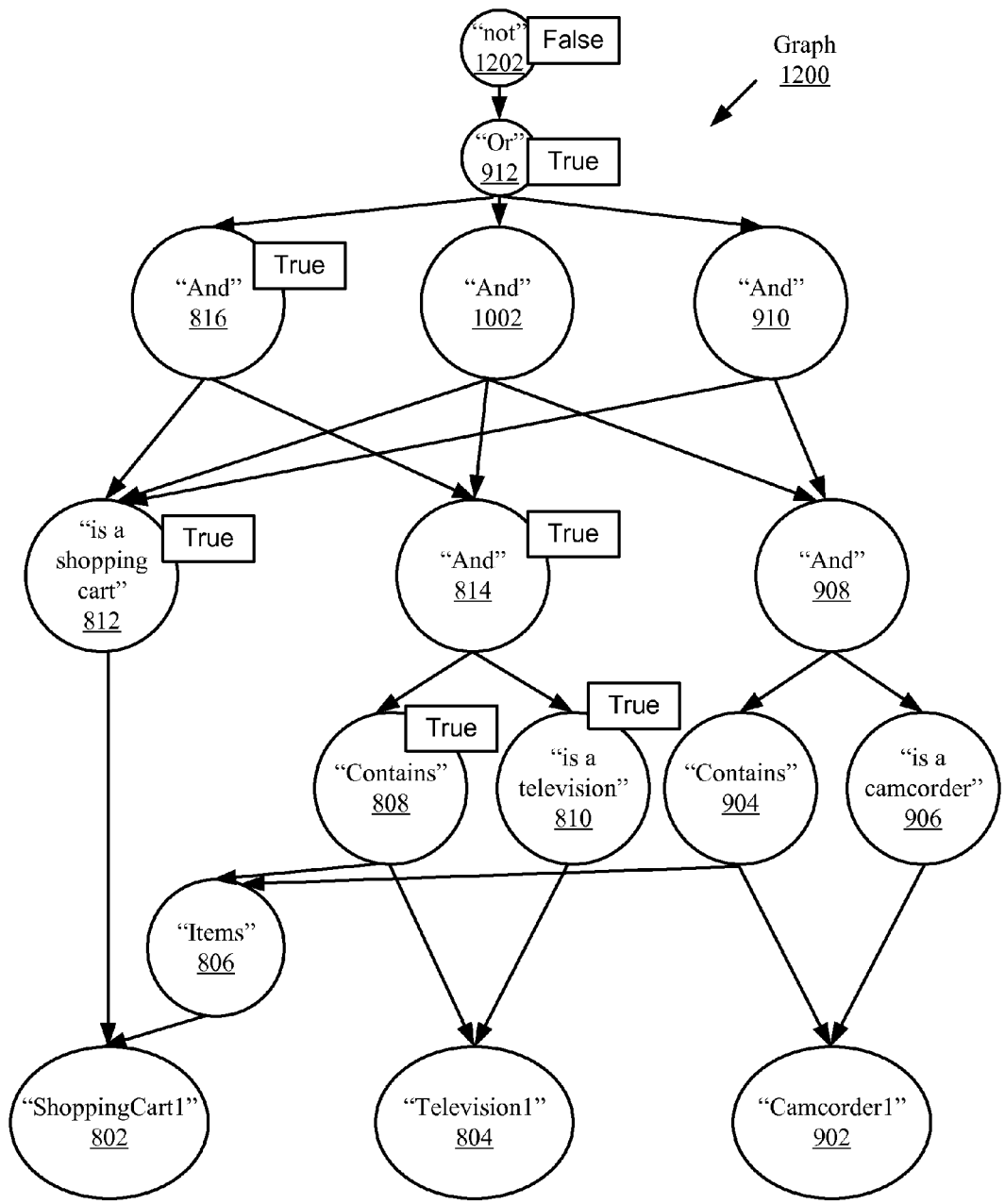
FIG. 12 is a schematic illustration of an exemplary graph that is useful for understanding the present invention.

It is not possible to find an inadmissible scope for the business rule project that satisfies all three (3) tests T1, T2 and T3 (as illustrated in FIG. 12). However, if any of the three (3) tests T1, T2 and T3 is dropped, there is an inadmissible scope satisfying the remaining tests. For example, a scope consisting of an empty shopping cart called "ShoppingCart1" and a television called "Television1" satisfies tests T1 and T2, but not test T3 since the shopping cart does not contain any item. A scope consisting of a shopping cart called "ShoppingCart1" and an object called "Television1" of an unknown type in the items of "ShoppingCart1" satisfies tests T1 and T3, but not T2 since it is not established that "Television1" is a television. Similarly, a scope consisting of an object called "ShoppingCart1" of an unknown type and an object called "Television1" of a type television which is in the items of "ShoppingCart1" satisfies tests T2 and T3, but not test T1. As all the three (3) scopes are inadmissible for the business rule project, this shows that the three (3) tests T1, T2 and T3 form a minimal subset of tests which are not satisfied by any inadmissible scope. Therefore, the tests T1, T2 and T3 represent a most-general admissible scope.

The above-provided discussion shows that the detection of a most-general admissible scope can be mapped to the problem of finding a minimal subset of tests (or constraints) from a foreground that are in conflict with a given background constraint. The description of an incomplete admissible scope produced by SGS 1106 provides the foreground constraints. The background constraint represents the inadmissible scopes, and therefore corresponds to the negation of the admissible scope graph. SGN 1110 builds an inadmissible scope graph by negating the admissible scope graph. SGN 1110 then supplies the inadmissible scope graph as the background constraint to the conflict-set minimizer 1108. The conflict-set minimizer 1108 then reduces the incomplete scope to the following INCOMPLETE MOST-GENERAL SCOPE.

Incomplete Most-General Scope
ShoppingCart1 is a shopping cart
Television1 is a television
the items of ShoppingCart1 contain Television1

Figure 13:
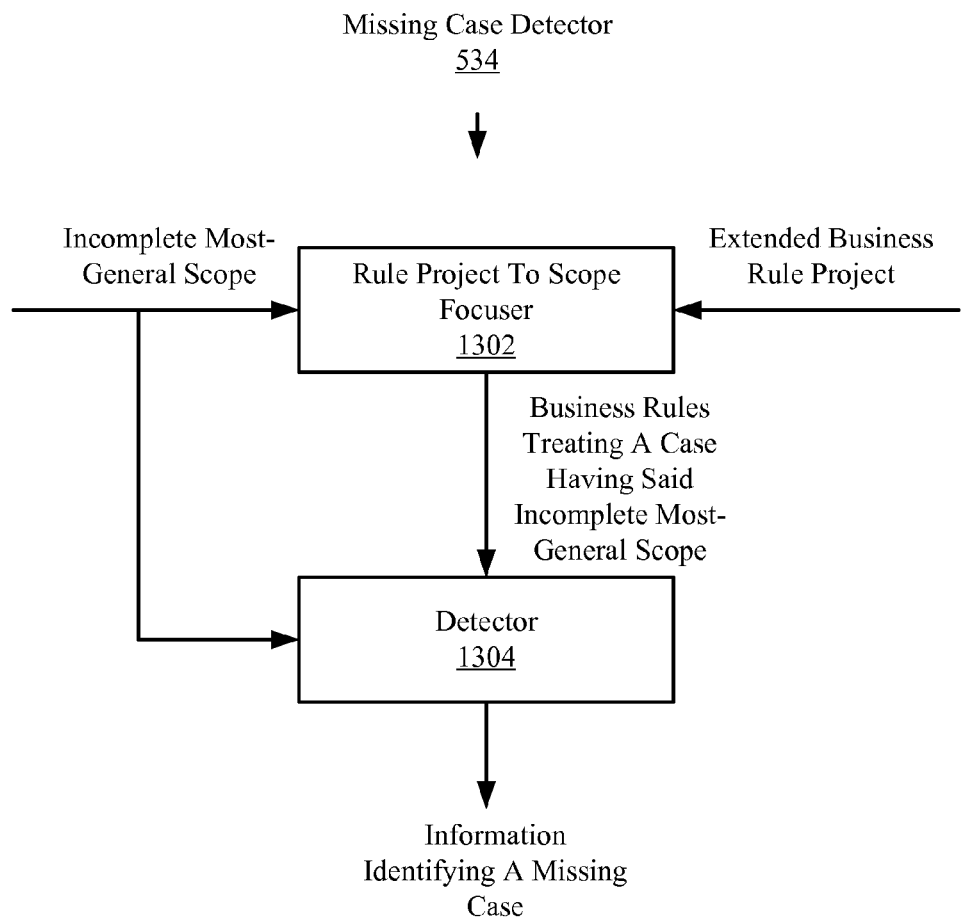
FIG. 13 is a detailed block diagram of an exemplary missing case detector that is useful for understanding the present invention.

As explained above in relation to FIG. 5, MCD 534 seeks a missing case within the incomplete most-general scope. A detailed block diagram of MCD 534 is provided in FIG. 13. As shown in FIG. 13, MCD 534 comprises a Rule Project to Scope Focuser (RPSF) 1302 and a detector 1304. RPSF 1302 and detector 1304 can be implemented in hardware, software and/or a combination thereof.

RPSF 1302 is configured to receive two (2) inputs. A first input includes information identifying and describing the incomplete most-general scope. A second input is information describing the extended business rule project. As noted above, the extended rule project contains the original business rules and generalized missing business rules which have been previously generated by MRG 536. Upon receiving the two (2) inputs, RPSF 1302 determines business rules that treat cases having the incomplete most-general scope. Thereafter, the RPSF 1302 analyzes the business rules for purposes of focusing the extended business rule project to a given scope. The analysis generally involves determining whether the scope matched by a business rule is a sub-scope of the incomplete most-general scope. In principle, this determination can be achieved by: describing the scopes matched by the business rules in the form of existential quantifiers (e.g., "there exists a shopping cart and a television in the items of the shopping-cart"); describing the incomplete most-general scope in the form of existential quantifiers; and determining whether the description of the incomplete most-general scope entails the description of the scopes matched by the business rules. The next paragraphs explain that this entailment check can be implemented by the missing-case detection technology as used in this disclosure.

The RPSF 1302 performs the entailment check for determining that the scope matched by a business rule is not a sub-scope of the incomplete most-general scope by the following method. In this regard, the RPSF 1302 transforms the business rule into a definition by removing all tests from the business rule. For example, BUSINESS RULE 2 is transformed by RPSF 1302 into the following DEFINITION.

Definition
definitions
   set 'ShoppingCart1' to a shopping cart;
   set 'Product1' to a television in the items of ShoppingCart1;
if
   true
then
   set the bonus points of 'the shopping cart' to 100.
Embodiments of the present invention are not limited in this regard.

After said transformation, RPSF 1302 determines whether the resulting definition treats all cases of the incomplete most-general scope or whether there is some missing case of the incomplete most-general scope which is not treated by the definition. For example, the RPSF 1302 can use the method discloses in European Patent Application No. EP 09172190 for carrying out this analysis. As the definition does not impose any particular test on the objects within its scope, it either treats all cases of the incomplete most-general scope or its treats none of the cases. If the definition treats all cases having the incomplete most-general scope, then the business rule scope matches the incomplete most-general scope. In this scenario, RPSF 1302 keeps the business rule for latter use. However, if the definition does not treat any cases having the incomplete most-general scope, then the business rule scope does not match the incomplete most-general scope. In this scenario, RPSF 1302 discards the business rule.

As a result of said determination, RPSF 1302 finds all business rules of a business rule project that are in the incomplete most-general scope. For example, if the incomplete most-general scope is scope 106 of FIG. 1, then RPSF 1302 selects BUSINESS RULE 2 and not BUSINESS RULES 1 and 3. Embodiments of the present invention are not limited in this regard.

After RPSF 1302 has completed it's operations, the detector 1304 identifies at least one missing case inside the incomplete most-general scope. Methods for identifying missing cases inside an incomplete most-general scope are known in the art, and therefore will not be described herein. Any such method can be used with the present invention without limitation. One such method for identifying missing cases inside a scope is described in European Patent Application No. EP 09172190.

In some embodiments, the detector 1204 identifies the following MISSING CASE including tests T1, T2, T3 and T4.
Missing Case
T1: ShoppingCart1 is a shopping cart
T2: Television1 is a television
T3: the items of ShoppingCart1 contain Television1
T4: the screen size of Television1 is less than 50.
Embodiments of the present invention are not limited in this regard.

As described above in relation to FIG. 5, the missing case is communicated from the MCD 534 to the MRG 536. A detailed block diagram of the MRG 536 is provided in FIG. 14. MRG 536 is generally configured for generalizing the missing case into a missing business rule by removing irrelevant tests therefrom. Removing tests increases the number of missing cases (e.g., from one (1) missing case to a group of missing cases). A group of missing cases is referred to herein as a "family of missing cases". The family of missing cases is used to generate the missing business rule. The missing business rule treats the cases inside the family of missing cases. The family of missing cases should not include any cases that are already treated by the existing business rules in order to avoid an unjustified overgeneralization of the missing business rules. The missing-rule generator therefore needs information about the original business rules to: determine whether a test is relevant; and to avoid the introduction of an overlap between missing business rules and original business rules.

It is important to note that MRG 536 introduces overlaps between different missing business rules in order to guarantee that the missing business rules have most-general conditions. Whereas a conventional MRG obeys an exact generalization policy for all the original business rules, MRG 536 permits an overlap between missing business rules and original business rules within more specific scopes if the original business rules match at least one object that is not matched by the missing business rules. MRG 536 thus permits an overgeneralization of missing business rules as far as more specific scopes are concerned, but MRG 536 achieves an exact generalization for the business rules within the same scope.

Figure 14:
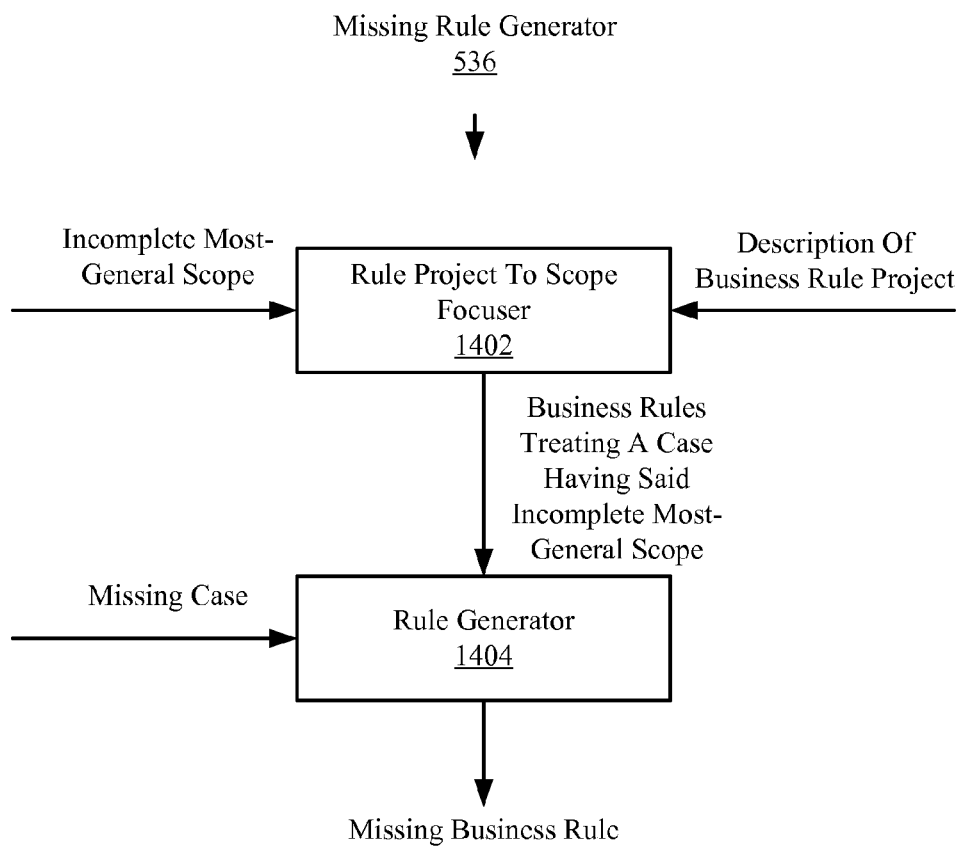
FIG. 14 is a detailed block diagram of an exemplary missing rule generator that is useful for understanding the present invention.

As shown in FIG. 14, MRG 536 comprises an RPSF 1402 and a rule generator 1404. RPSF 1402 determines all business rules contained in the original business project that treat cases having the incomplete most-general scope. For example, if the incomplete most-general scope is scope 106 of FIG. 1, then RPSF 1402 selects BUSINESS RULE 2 and not BUSINESS RULES 1 and 3. Embodiments of the present invention are not limited in this regard.

It should be understood that RPSF 1402 discards all business rules having a more specific scope as compared to the incomplete most-general scope. RPSF 1402 also discards all business rules that treat cases having scopes that are unrelated to the incomplete most-general scopes. Consequently, the operations of the rule generator 1404 are focused to all business rules treating cases having scopes which are sub-scopes of the incomplete most-general scope or which are equal to the incomplete most-general scope.

The rule generator 1404 identifies missing business rules from the business rules selected by RPSF 1402. Thereafter, the rule generator 1404 selects a missing business rule from the identified missing business rules that has the most-general conditions. The selected missing business rule is referred to herein as a "generalized missing business rule".

In view of the forgoing, the present invention achieves generalization of missing rules using three (3) components, namely ISDG 532, MCD 534 and MRG 536. ISDG 532 uses a combination of the admissible-scope description and a rules-inhibition graph describing the missing cases of the business rule project in order to find an incomplete most-general scope. As the incomplete most-general scope may select objects from different business rule scopes and scope kernels, the ISDG 532 uses consistency-based explanation methods to identify a minimal set of objects that are sufficient to constitute an incomplete most-general scope. MCD 534 then focuses the missing-case detection to the business rules that are in the incomplete most-general scope. Similarly, MRG 536 uses only business rules in the incomplete most-general scope in order to check whether the generated missing business rules overlap with existing business rules.

MRG 536 uses information of the original business rules in order to prevent an overgeneralization of the missing business rules. MRG 536 ensures that the missing business rules do not treat any of the cases that are already treated by the existing business rules. MRG 536 allows overlaps between a missing business rule and an original business rule if the scope of the original business rule contains at least one object outside the scope of the missing business rule (i.e. if the original business rule matches additional objects). MRG 536 ensures that missing business rules do not overlap with original business rules of same scope or smaller scopes. This controlled form of overgeneralization ensures that the missing business rules not only match cases of same scope, but also cases of more specific scopes. This capability avoids the explosion of scopes of the missing business rules and ensures that the missing business rules have the same form as the original business rules. The present invention thus provides a means to find the scope of the missing business rules (i.e., the right objects to be matched by the business rules).

Exemplary Method Embodiments of the Present Invention

Figure 15:
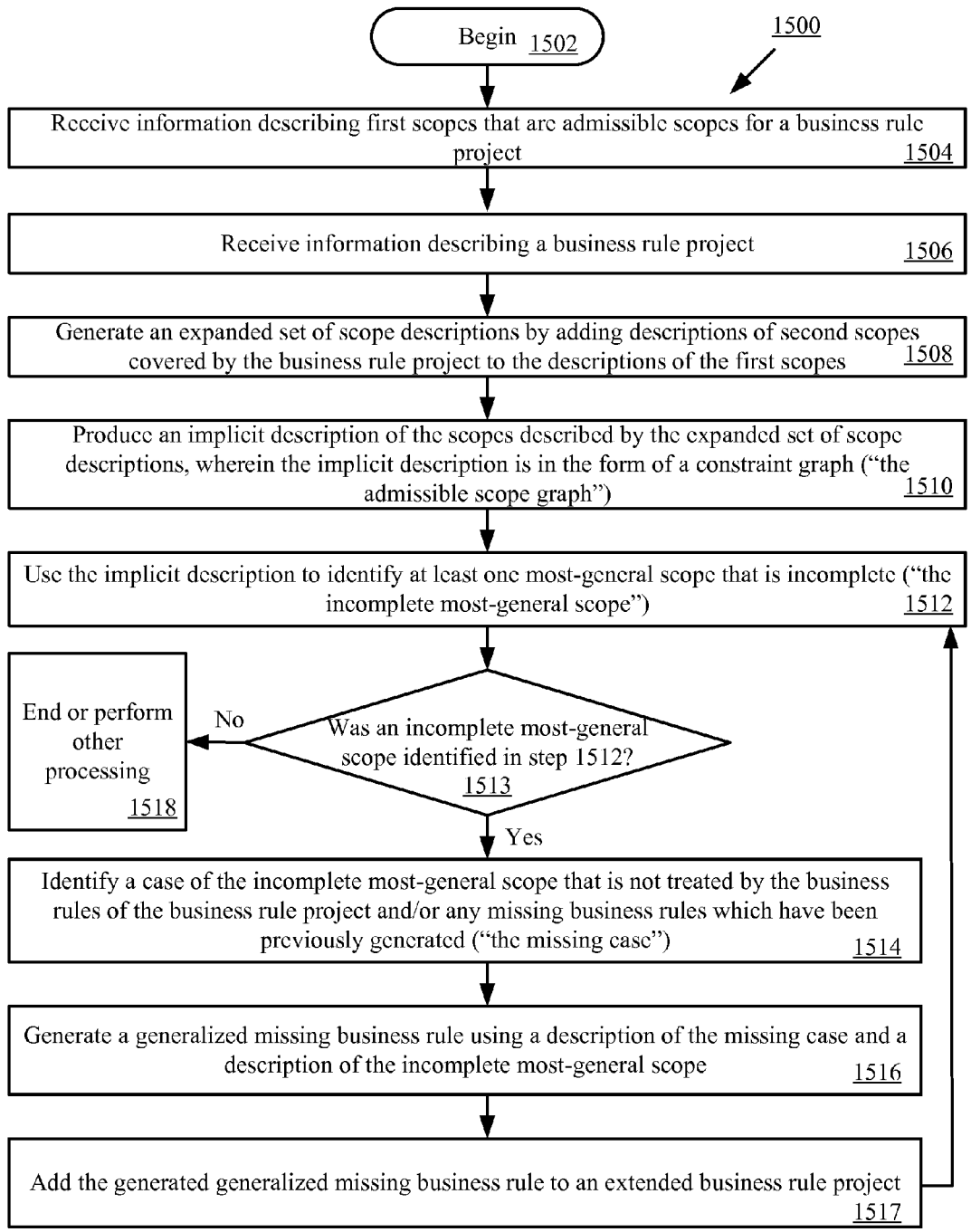
FIG. 15 is a flow diagram of an exemplary method for generating a missing business rule that is useful for understanding the present invention.

Referring now to FIG. 15, there is provided an exemplary method 1500 for generating a missing business rule that is useful for understanding the present invention. As shown in FIG. 15, method 1500 begins with step 1502 and continues with step 1504. Step 1504 involves receiving information describing first scopes that are admissible for a business rule project. In a next step 1506, information is also received which describes a business rule project.

After completion of step 1506, step 1508 is performed where an expanded set of scope descriptions is generated. The expanded set of scope descriptions is generated by adding descriptions of second scope covered by the business rule project to the descriptions of the first scopes. Thereafter, an implicit description of the scope described by expanded set of scope descriptions is produced, as shown by step 1510. The implicit description is in the form of a constraint graph.

In a next step 1512, the implicit description is used to identify at least one most-general scope that is incomplete ("the incomplete most-general scope"). If there is no incomplete most-general scope [1513:NO], then step 1518 is performed. In step 1518, method 1500 ends or other processing is performed. Notably, the other processing can involve using the set of business rules to control operations of a business organization. If there is an incomplete most-general scope [1513:YES], then step 1514 is performed. In step 1514, a case of the incomplete most-general scope is then identified. The case is a case that is not treated by the business rules of the business rule project and/or any missing business rules that have been previously generated.

Upon completing step 1514, step 1516 is performed where a generalized missing business rule is generated. The generalized missing business rule is generated using a description of the missing case and a description of the incomplete most-general scope. After performing step 1516, step 1517 is performed where the generated generalized missing business rule is added to the extended business rule project. Thereafter, the method 1500 returns to step 1512.

Figure 16:
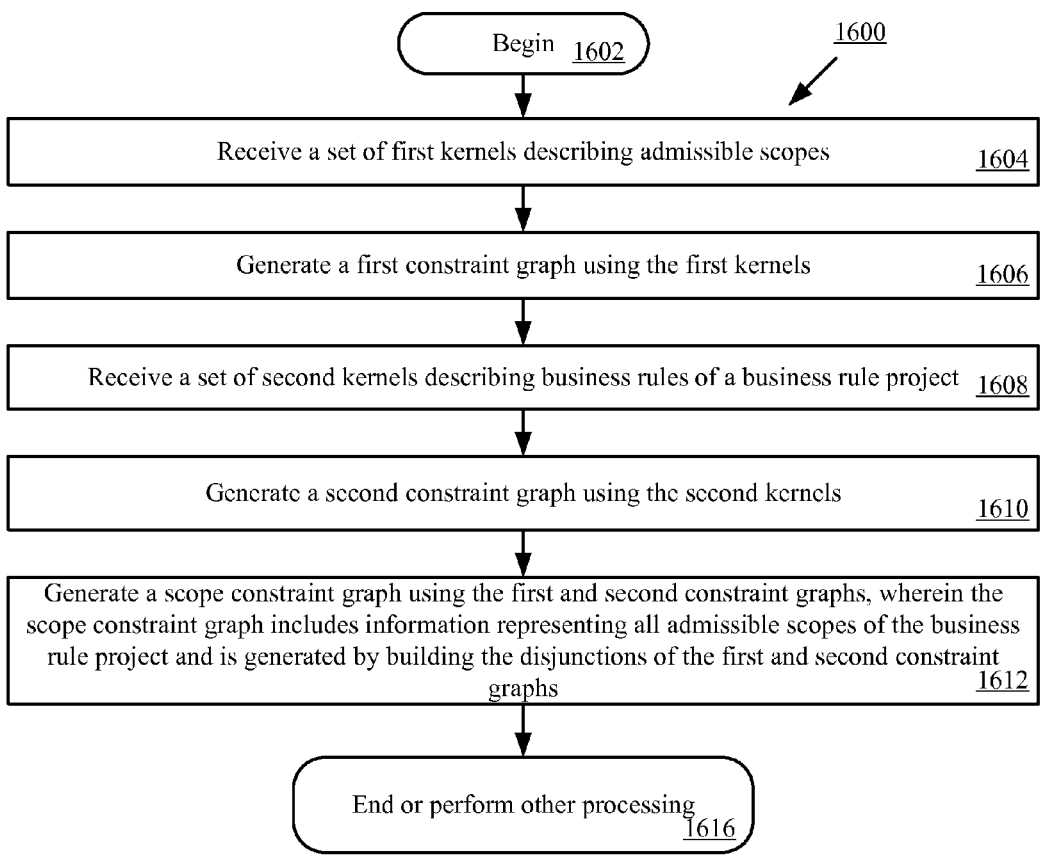
FIG. 16 is a flow diagram of an exemplary method for generating an admissible scope graph that is useful for understanding the present invention.

Referring now to FIG. 16, there is provided an exemplary method 1600 for generating an admissible scope graph that is useful for understanding the present invention. As shown in FIG. 16, method 1600 begins with step 1602 and continues with step 1604. In step 1604, a set of first kernels is received. The first kernels describe admissible scopes. The first kernels are used in step 1606 to generate a first constraint graph. In step 1608, a set of second kernels are received. The second kernels describe business rules of a business rule project. The second kernels are used in step 1610 to generate a second constraint graph. The first and second constraint graphs are then used in step 1612 to generate a scope constraint graph. The scope constraint graph includes information representing all admissible scopes for the business rule project. The scope constraint graph is generated by building the disjunctions of the first and second constraint graphs. Thereafter, the method ends or other processing is performed, as shown by step 1616.

Figure 17:
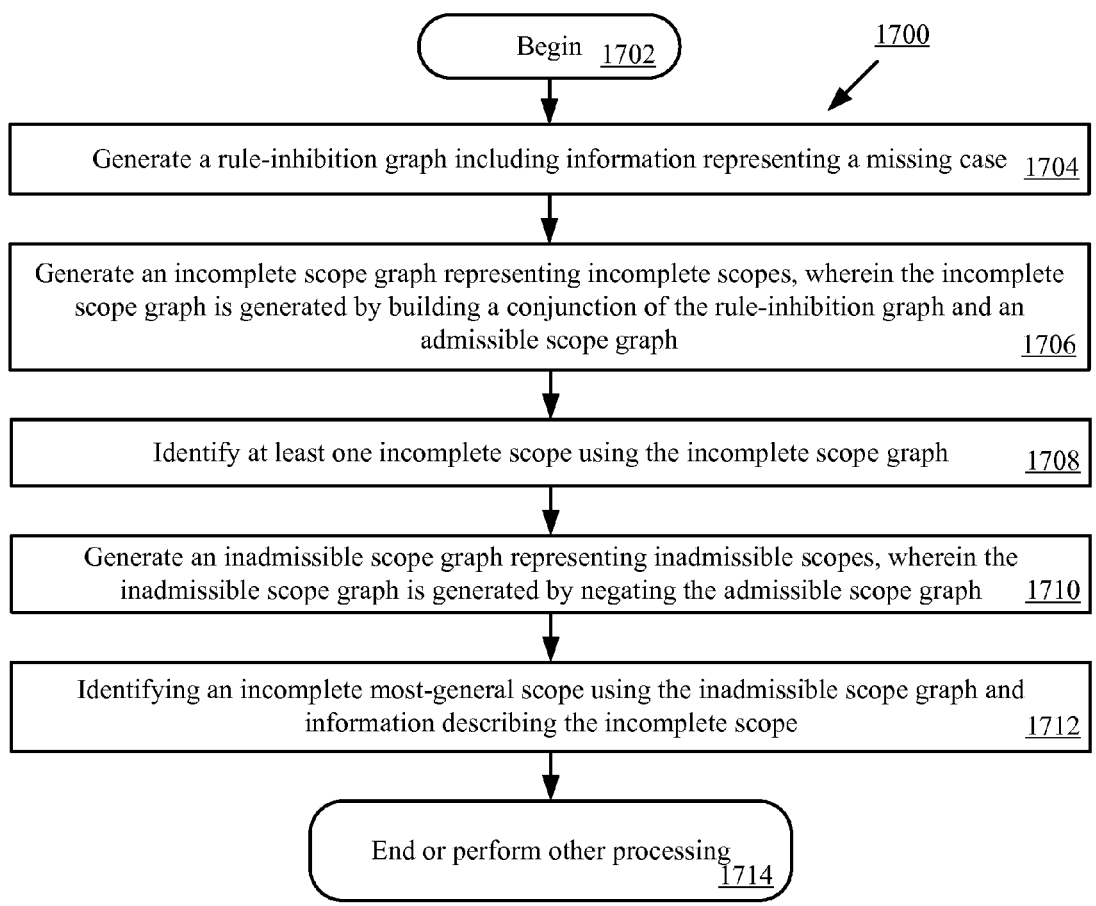
FIG. 17 is a flow diagram of an exemplary method for determining an incomplete most-general scope that is useful for understanding the present invention.

Referring now to FIG. 17, there is provided an exemplary method 1700 for determining an incomplete most-general scope that is useful for understanding the present invention. As shown in FIG. 17, method 1700 begins with step 1702 and continues with step 1704. In step 1704, a rule-inhibition graph is generated including information representing a missing case. The rule-inhibition graph is then used to generate an incomplete scope graph, as shown by step 1706. The incomplete scope graph includes information representing incomplete scopes. The incomplete scope graph is generated by building a conjunction of the rule-inhibition graph and an admissible scope graph. The incomplete scope graph is then used in step 1708 to identify at least one incomplete scope.

In a next step 1710, an inadmissible scope graph is generated. The inadmissible scope graph includes information representing inadmissible scope for a business rule project. The inadmissible scope graph is generated by negating the admissible scope graph. Thereafter, in step 1712, the incomplete scope graph and information describing the incomplete scope are used to identify an incomplete most-general scope. Subsequent to identifying the incomplete most-general scope, the method 1700 ends or other processing is performed, as shown by step 1714.

Figure 18:
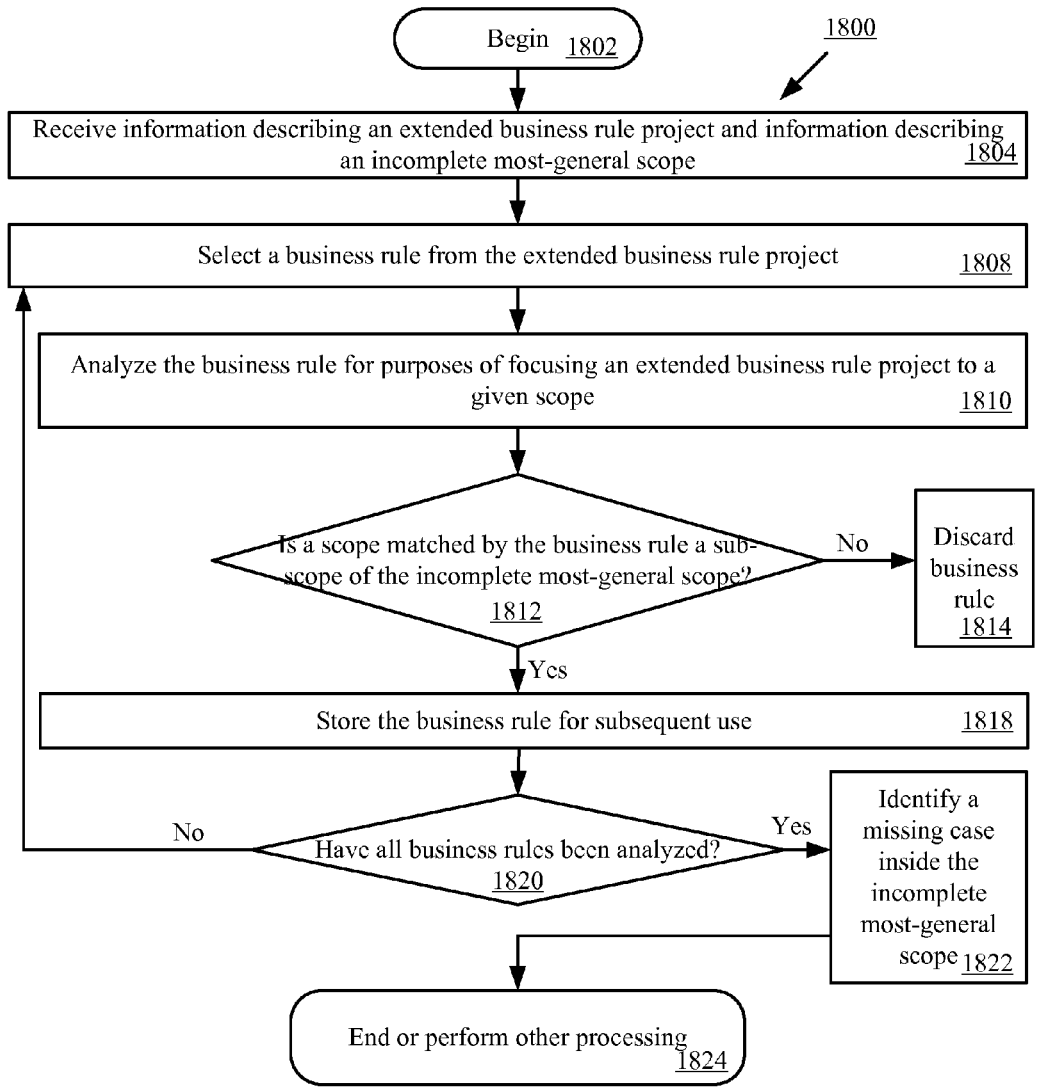
FIG. 18 is a flow diagram of a method for identifying a missing case that is useful for understanding the present invention.

Referring now to FIG. 18, there is provided an exemplary method 1800 for identifying a missing case that is useful for understanding the present invention. As shown in FIG. 18, method 1800 begins with step 1802 and continues with step 1804. In step 1804, information describing an extended business rule project is received. Also, information describing an incomplete most-general scope is received in step 1804.

In a next step 1808, one of the business rules is selected from the extended business rule project. The selected business rule is then analyzed in step 1810 for purposes of focusing an extended business rule project to a given scope. In a next decision step 1812, a decision is made as to whether a scope matched by the business rule is a sub-scope of the incomplete most-general scope. If it is determined that the scope matched by the business rule is not a sub-scope of the incomplete most-general scope [1812:NO], then step 1814 is performed where the business rule is discarded. If it is determined that the scope matched by the business rule is a sub-scope of the incomplete most-general scope [1812:YES], then method 1800 continues with step 1818 where the business rule is stored for later use.

Upon completing step 1818, a decision is made as to whether all business rules have been analyzed. If all business rules have not been analyzed [1820:NO], then method 1800 returns to step 1808. If all business rules have been analyzed [1820:YES], then step 1822 is performed where a missing case inside of the incomplete most-general case is identified. Thereafter, step 1824 is performed where method 1800 ends or other processing is performed.

Figure 19:
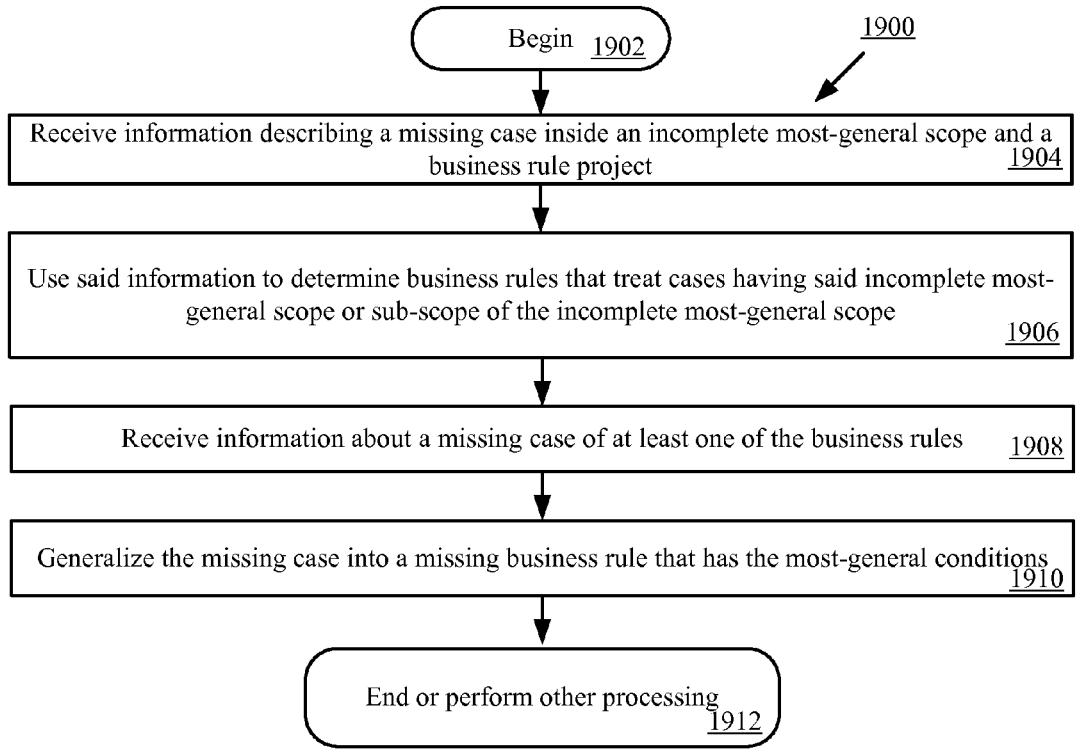
FIG. 19 is a flow diagram of a method for generalizing a missing case into a missing rule that is useful for understanding the present invention.

Referring now to FIG. 19, there is provided an exemplary method 1900 for generalizing a missing case into a missing rule that is useful for understanding the present invention. As shown in FIG. 19, method 1900 begins with step 1902 and continues with step 1904. In step 1904, information is received that describes an incomplete most-general scope and an original business rule project. The information is then used in step 1906 to determine business rules that treat cases having the incomplete most-general scope or sub-scopes of the incomplete most-general scope. In a next step 1908, information about a missing case of all these business rules is received. In step 1910, the missing case is generalized into a missing business rule that has the most-general conditions. Thereafter, step 1912 is performed where method 1900 ends or other processing is performed.

In light of the forgoing description of the invention, it should be recognized that the present invention can be realized in hardware, software, or a combination of hardware and software. A method for matching gain levels of transducers according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. A system, comprising:
    at least one electronic circuit comprising a memory having stored thereon instructions, which when executed by said electronic circuit, cause said electronic circuit to perform the following operations comprising:
        receiving descriptions of first scopes that are admissible for a first rule project, said first rule project comprising a plurality of first rules and each of said first scopes being defined by at least one object characterizing a case;
        generating an expanded set of scope descriptions by adding descriptions of second scopes covered by said first rule project to said descriptions of said first scopes;
        producing an implicit description of said first and second scopes described by said expanded set of scope descriptions, said implicit description comprising a disjunction of first constraint graphs describing said first scopes and second constraint graphs describing scopes of cases treated by said plurality of first rules;
        identifying an incomplete most-general scope from said first and second scopes using said implicit description, said incomplete most-general scope being a scope which is defined by a minimal set of objects, is admissible for said first rule project and covers at least one case which is not treated by a second rule project;
        identifying a missing case of said incomplete most-general scope that is not treated by said first rule project;
        generating a generalized missing rule using information describing said missing case and said incomplete most-general scope; and
        using said generalized missing rule to control operations of a business organization.

2. The system according to claim 1, wherein said second rule project includes at least one rule comprising said first rule project.

3. A system, comprising:
    at least one electronic circuit comprising a memory having stored thereon instructions, which when executed by said electronic circuit, cause said electronic circuit to perform the following operations comprising:
        receiving descriptions of first scopes that are admissible for a first rule project, said first rule project comprising a plurality of first rules and each of said first scopes being defined by at least one object characterizing a case;
        generating an expanded set of scope descriptions by adding descriptions of second scopes covered by said first rule project to said descriptions of said first scopes;
        producing an implicit description of said first and second scopes described by said expanded set of scope descriptions;
        identifying an incomplete most-general scope from said first and second scopes using said implicit description, said incomplete most-general scope being a scope which is defined by a minimal set of objects, is admissible for said first rule project and covers at least one case which is not treated by a second rule project;
        identifying a missing case of said incomplete most-general scope that is not treated by said first rule project;
        generating a generalized missing rule using information describing said missing case and said incomplete most-general scope; and
        using said generalized missing rule to control operations of a business organization;
    wherein said implicit description is in the form of a constraint graph; and
    wherein said electronic circuit is further caused to generate said constraint graph by:
        generating a first constraint graph using said information describing said first scopes;
        generating a second constraint graph using said information describing said first rule project; and
        generating a third constraint graph by building a disjunction of said first and second constraint graphs, said third constraint graph including information representing all scopes that are admissible for said first rule project.

4. A system, comprising:
    at least one electronic circuit comprising a memory having stored thereon instructions, which when executed by said electronic circuit, cause said electronic circuit to perform the following operations comprising:
        receiving descriptions of first scopes that are admissible for a first rule project, said first rule project comprising a plurality of first rules and each of said first scopes being defined by at least one object characterizing a case;
        generating an expanded set of scope descriptions by adding descriptions of second scopes covered by said first rule project to said descriptions of said first scopes;
        producing an implicit description of said first and second scopes described by said expanded set of scope descriptions;
        identifying an incomplete most-general scope from said first and second scopes using said implicit description, said incomplete most-general scope being a scope which is defined by a minimal set of objects, is admissible for said first rule project and covers at least one case which is not treated by a second rule project;
        identifying a missing case of said incomplete most-general scope that is not treated by said first rule project;

generating a generalized missing rule using information describing said missing case and said incomplete most-general scope; and using said generalized missing rule to control operations of a business organization;

wherein said electronic circuit identifies said incomplete most-general scope by:

generating a rule-inhibition graph including information representing at least one case which is not covered by said first and second scopes described by said expanded set of scope descriptions;

generating an incomplete scope graph by building a conjunction of said rule-inhibition graph and said implicit description which is in the form of a constraint graph;

using said incomplete scope graph to identify an incomplete scope;

generating an inadmissible scope graph by negating said constraint graph; and using said incomplete scope and said inadmissible scope graph to identify said incomplete most-general scope.

5. The system according to claim 1, wherein said electronic circuit identifies said missing case by determining a plurality of second rules using information describing said second rule project and said incomplete most-general scope, said second rule project comprising said plurality of first rules and at least one previously generated missing rule, and said plurality of second rules treating cases having said incomplete most-general scope.

6. The system according to claim 5, wherein said second rule project comprises a plurality of previously generated missing rules which differ in scope.

7. The system according to claim 5, wherein said electronic circuit is further caused to determine if a scope matched by a rule of said plurality of second rules is a sub-scope of said incomplete most-general scope.

8. The system according to claim 7, wherein said electronic circuit is further caused to discard said rule if it is determined that said scope matched by said rule is not a sub-scope of said incomplete most-general scope.

9. The system according to claim 7, wherein said electronic circuit is further caused to determine if said rule treats a missing case of said incomplete most-general scope.

10. The system according to claim 7, wherein said electronic circuit is further caused to retain said rule if it is determined that said scope matched by said rule is a sub-scope of said incomplete most-general scope.

11. A system, comprising:

at least one electronic circuit comprising a memory having stored thereon instructions, which when executed by said electronic circuit, cause said electronic circuit to perform the following operations comprising:

receiving descriptions of first scopes that are admissible for a first rule project, said first rule project comprising a plurality of first rules and each of said first scopes being defined by at least one object characterizing a case;

generating an expanded set of scope descriptions by adding descriptions of second scopes covered by said first rule project to said descriptions of said first scopes;

producing an implicit description of said first and second scopes described by said expanded set of scope descriptions;

identifying an incomplete most-general scope from said first and second scopes using said implicit description, said incomplete most-general scope being a scope which is defined by a minimal set of objects, is admissible for said first rule project and covers at least one case which is not treated by a second rule project;

identifying a missing case of said incomplete most-general scope that is not treated by said first rule project;

generating a generalized missing rule using information describing said missing case and said incomplete most-general scope; and using said generalized missing rule to control operations of a business organization wherein said electronic circuit generates said generalized missing rule by:

determining a plurality of second rules that treat cases having said incomplete most-general scope or sub-scopes of the incomplete most-general scope;

analyzing said plurality of second rules to identify third rules that treat said missing case; and selecting a fourth rule from said third rules that has the most-general conditions thereof.

12. The system according to claim 1, wherein said electronic circuit is further caused to generate all missing rules of said first rule project which have most-general scopes and most-general conditions.

13. The system according to claim 12, wherein said plurality of generalized missing rules are generated by adding said generalized rule to said second rule project.

14. The system according to claim 13, wherein said plurality of generalized missing rules are generated by iteratively performing at least said identifying said incomplete most-general scope step, said identifying said missing case step, said generating said generalized missing rule step, and said adding step until said second rule project has no incomplete most-general scopes.

* * * * *